United States Patent
Abou-Rizk et al.

(10) Patent No.: US 12,317,188 B2
(45) Date of Patent: May 27, 2025

(54) EXTENSION OF BEACON OPERATIONAL LIFE USING INTEGRAL PHOTOCELL

(71) Applicant: ABL IP HOLDING LLC, Conyers, GA (US)

(72) Inventors: Mitri J. Abou-Rizk, Newton, MA (US); Yenpao Lu, Cumming, GA (US); Sajin George, Somerville, MA (US); Sean Serpa, Quincy, MA (US)

(73) Assignee: ABL IP Holding LLC, Conyers, GA (US)

( * ) Notice: Subject to any disclaimer, the term of this patent is extended or adjusted under 35 U.S.C. 154(b) by 655 days.

(21) Appl. No.: 17/350,807

(22) Filed: Jun. 17, 2021

(65) Prior Publication Data

US 2021/0314867 A1    Oct. 7, 2021

Related U.S. Application Data

(63) Continuation-in-part of application No. 16/026,325, filed on Jul. 3, 2018, now Pat. No. 11,105,886.

(51) Int. Cl.
*H04W 52/02* (2009.01)
*G06Q 30/02* (2023.01)
(Continued)

(52) U.S. Cl.
CPC .... *H04W 52/0229* (2013.01); *G06Q 30/0261* (2013.01); *H04W 4/06* (2013.01); *H04W 52/0222* (2013.01); *H04W 52/0241* (2013.01)

(58) Field of Classification Search
CPC . H04W 52/0229; H04W 52/022; H04W 4/06; H04W 52/0241; G06Q 30/0261
See application file for complete search history.

(56) References Cited

U.S. PATENT DOCUMENTS 6,113,504 A    9/2000 Kuesters
9,711,047 B1   7/2017 Knas et al.
(Continued)

FOREIGN PATENT DOCUMENTS

WO    2016098635 A1    6/2016

OTHER PUBLICATIONS

U.S. Appl. No. 15/916,861, filed Mar. 9, 2018, 57 pages.
(Continued)

*Primary Examiner* — Muthuswamy G Manoharan
(74) *Attorney, Agent, or Firm* — Buchanan Ingersoll & Rooney PC

(57) ABSTRACT

Examples of a system and wireless RF device having an extended operational life are provided. The wireless RF device includes a substrate, at least one sensor configured to detect an occurrence of an event, a RF transceiver arranged on the substrate and configured to transmit and receive RF signals in an area, and a power supply coupled with the substrate. A processing device is coupled to the at least one sensor and the RF transceiver, and configured to: in response to expiration of a time period or the detection of the occurrence of an event, transition the RF device from a sleep or standby mode to an active mode; configure the RF transceiver to receive or transmit a data packet; obtain a status of an occurrence of another event from the at least one sensor; and transition the RF device from the active mode to the sleep or standby mode.

18 Claims, 18 Drawing Sheets

(51) Int. Cl.
    *G06Q 30/0251*     (2023.01)
    *H04W 4/06*     (2009.01)

(56) References Cited

U.S. PATENT DOCUMENTS

| | | |
|---|---|---|
| 9,711,048 B1 | 7/2017 | Knas et al. |
| 9,721,451 B1 | 8/2017 | Knas et al. |
| 9,741,237 B1 | 8/2017 | Knas et al. |
| 9,877,266 B1 | 1/2018 | Knas et al. |
| 9,877,298 B1 | 1/2018 | Knas et al. |
| 9,881,484 B1 | 1/2018 | Knas et al. |
| 9,883,570 B1 | 1/2018 | Turvy, Jr. et al. |
| 9,949,091 B1 | 4/2018 | Knas et al. |
| 9,984,556 B1 | 5/2018 | Knas et al. |
| 10,194,276 B1 | 1/2019 | Singamsetty et al. |
| 10,228,444 B2 | 3/2019 | Jonsson |
| 10,264,652 B2 | 4/2019 | Chemel |
| 2008/0191941 A1 | 8/2008 | Saban et al. |
| 2012/0044350 A1 | 2/2012 | Verfuerth |
| 2014/0225804 A1 | 8/2014 | Wild et al. |
| 2016/0154484 A1* | 6/2016 | Kampf .................. G06F 1/3259 345/179 |
| 2018/0107576 A1 | 4/2018 | Walden et al. |
| 2018/0324744 A1 | 11/2018 | Patel et al. |
| 2021/0183229 A1* | 6/2021 | Krejcarek .............. G08B 5/223 |
| 2022/0137476 A1* | 5/2022 | Trikha ..................... E06B 9/24 359/265 |

OTHER PUBLICATIONS

Non-Final Office Action dated Nov. 18, 2020 (32 pages) received in U.S. Appl. No. 16/026,325, filed Jul. 3, 2018.

Notice of Allowance dated May 5, 2021 (5 pages) received in U.S. Appl. No. 16/026,325, filed Jul. 3, 2018.

\* cited by examiner

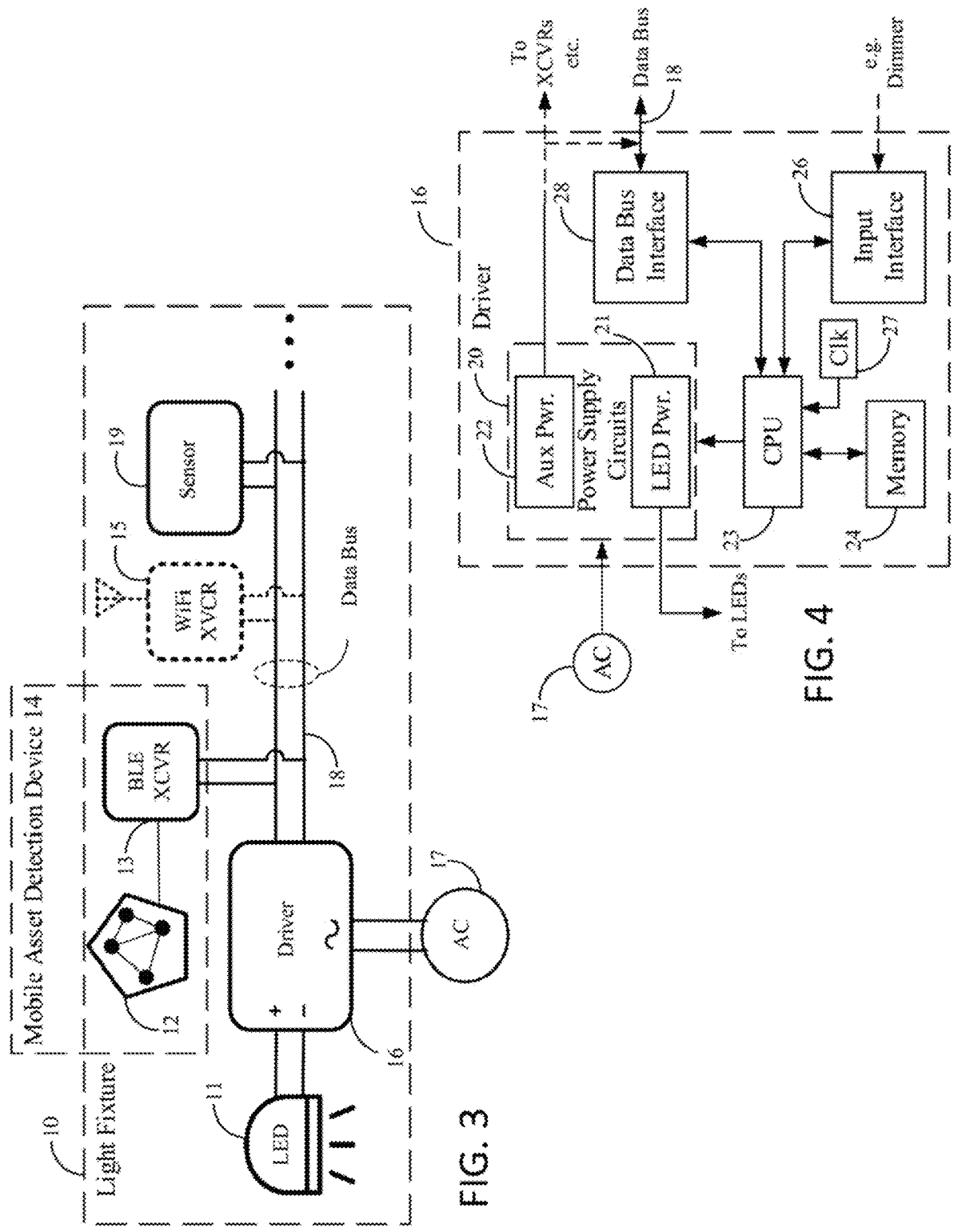

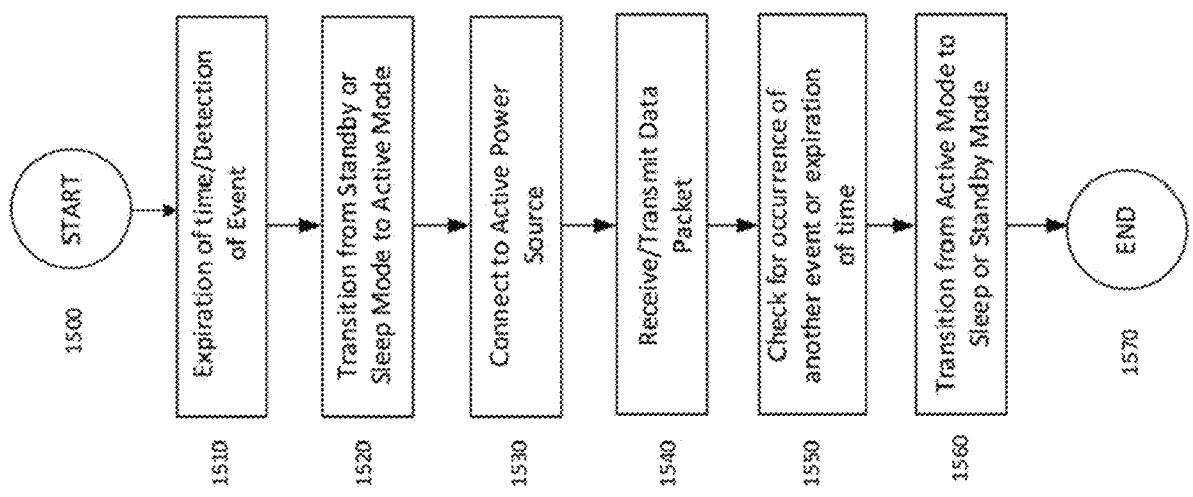

1600

EXTENSION OF BEACON OPERATIONAL LIFE USING INTEGRAL PHOTOCELL

CROSS-REFERENCE TO RELATED APPLICATIONS

This application is a continuation-in-part of U.S. patent application Ser. No. 16/026,325, filed on Jul. 3, 2018, titled "THREE-DIMENSIONAL ASSET TRACKING USING RADIO FREQUENCY-ENABLED NODES," the entire disclosure of which is incorporated herein by reference.

TECHNICAL FIELD

The present subject matter relates generally to techniques and equipment to extend the operational life of wireless radio frequency (RF) beacons or asset tags. The disclosed subject matter further relates to improvements in determining a location of a mobile asset in three-dimensions.

BACKGROUND

Today, beacons or asset tags that employ very-low-power wireless technologies—e.g., Bluetooth Low Energy (BLE)—are often manufactured with an internal, non-re-placeable, non-rechargeable battery as their power supply. Having this type of power supply for the beacon makes the beacon manufacture and installation simpler and cheaper, as no power wiring need be installed for the beacon because there is no need to include a power supply and/or battery charger. Further, low-power RF technology may use so little energy that the working lives of such non-replaceable and non-rechargeable battery-powered units can be measured in years.

After manufacture, beacons are typically stored in containers such as opaque boxes, e.g. of paperboard, either individually or in case lots. As such, the pre-deployment, in-storage state for a beacon, may be typically in darkness. However, during the storage state, the beacon typically beacons, i.e., regularly broadcasts short messages announcing their presence and identity as soon as the power supply is installed in the manufacture stage. This consumes a small amount of power. Thus, the time spent in storage and beaconing uselessly, decreases the amount of energy that is available and needed during an operating lifetime for the beacon.

Additionally, when such beacon units do finally run out of energy, the actual beacon must be replaced, which entails the cost of new units and of labor to perform the replacement.

The positions of asset tags or beacons, such as radio frequency identification (RFID) tags, may be tracked using a number of different technologies, such as RFID, global positioning system (GPS), or other radio frequency systems, such as cellular telephone communication. However, these systems may lack range, be subject to interference, or may be overly complex to implement and maintain, or may rely on third party providers of the particular communication services, such as a cellular provider. In addition, depending upon the service area, known position determining techniques may lack accuracy, and may not provide additional information, such as an identifier of the asset tag.

Estimates of an asset tag's position in an extended (e.g., urban-scale) service area may be determined using existing technologies. However, the position estimates lack accuracy and may be unsuitable for real-time three dimensional tracking throughout a three-dimensional service volume. As mentioned above, three-dimensional positions of a device may be determined using a number of technologies, such as GPS, but such technology has drawbacks, such as the hardware for such position-determining systems is relatively complex and is limited with regard to providing location determination functionality. For example, GPS and other positioning technology does not provide for the association of unique identities with the location information, nor provide for reporting of tag positions to a distant or central computational capability, nor provide a tracking function that enables devices to be monitored throughout a service volume. In addition, GPS signals may be occluded by structures in an urban environment.

SUMMARY

There is a need for a device and system to extend the operational life of RF beacons by conserving and prolonging battery power, which in turn reduces costs and labor involved in charging or replacing batteries for the RF beacon or asset tags.

An example of a beacon device having an extended operation life may include a wireless radio frequency device including a substrate, at least one sensor configured to detect an occurrence of an event, and a radio frequency transceiver arranged on the substrate and configured to transmit and receive radio frequency signals in an area. At least one power supply is coupled with the substrate. A processing device is couple to the at least one sensor and the radio frequency transceiver. The processing device is configured, upon execution of instructions maintained in firmware, to: in response to expiration of a time period or the detection of the occurrence of an event, transition the radio frequency device from a sleep or standby mode to an active mode; configure the radio frequency transceiver to receive or transmit a data packet; upon completion of the receiving or transmitting of the data packet, obtain a status of an occurrence of another event from the at least one sensor; and upon completion of a function of the another event, transition the radio frequency device from the active mode to the sleep or standby mode.

A system example may include a plurality of radio frequency-enabled nodes networked to communicate in an area. Each respective node is configured to transmit and receive a radio frequency signal. A wireless radio frequency device is configured to communicate with one or more of the radio frequency-enabled nodes. The radio frequency-enabled device may include a substrate, at least one sensor configured to detect an occurrence of an event, and a radio frequency transceiver arranged on the substrate and configured to transmit and receive radio frequency signals in an area. At least one power supply is coupled to the substrate. A processing device is couple to the at least one sensor and the radio frequency transceiver. The processing device is configured, upon execution of instructions maintained in firmware, to: in response to expiration of a time period or the detection of the occurrence of an event, transition the radio frequency device from a standby or sleep mode to an active mode; configured the radio frequency transceiver to receive or transmit a data packet; upon completion of the receiving or transmitting or the data packet, obtain a status of an occurrence of another event from the at least one sensor; and upon completion of a function of the another event, transition the radio frequency device from the active mode to the standby or sleep mode.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 3 is a simplified, functional block diagram of an example of a light fixture or other type lighting device, with at least one wireless transceiver and a multi-element antenna array.

FIG. 4 is a simplified, functional block diagram of an example of a driver, providing a data bus, as may be used in the example light fixture of FIG. 3.

FIG. 15 is a flow diagram illustrating an example of a process flow for extending the operational life an asset tracking tag or RF beacon.

DETAILED DESCRIPTION

Figure 1:
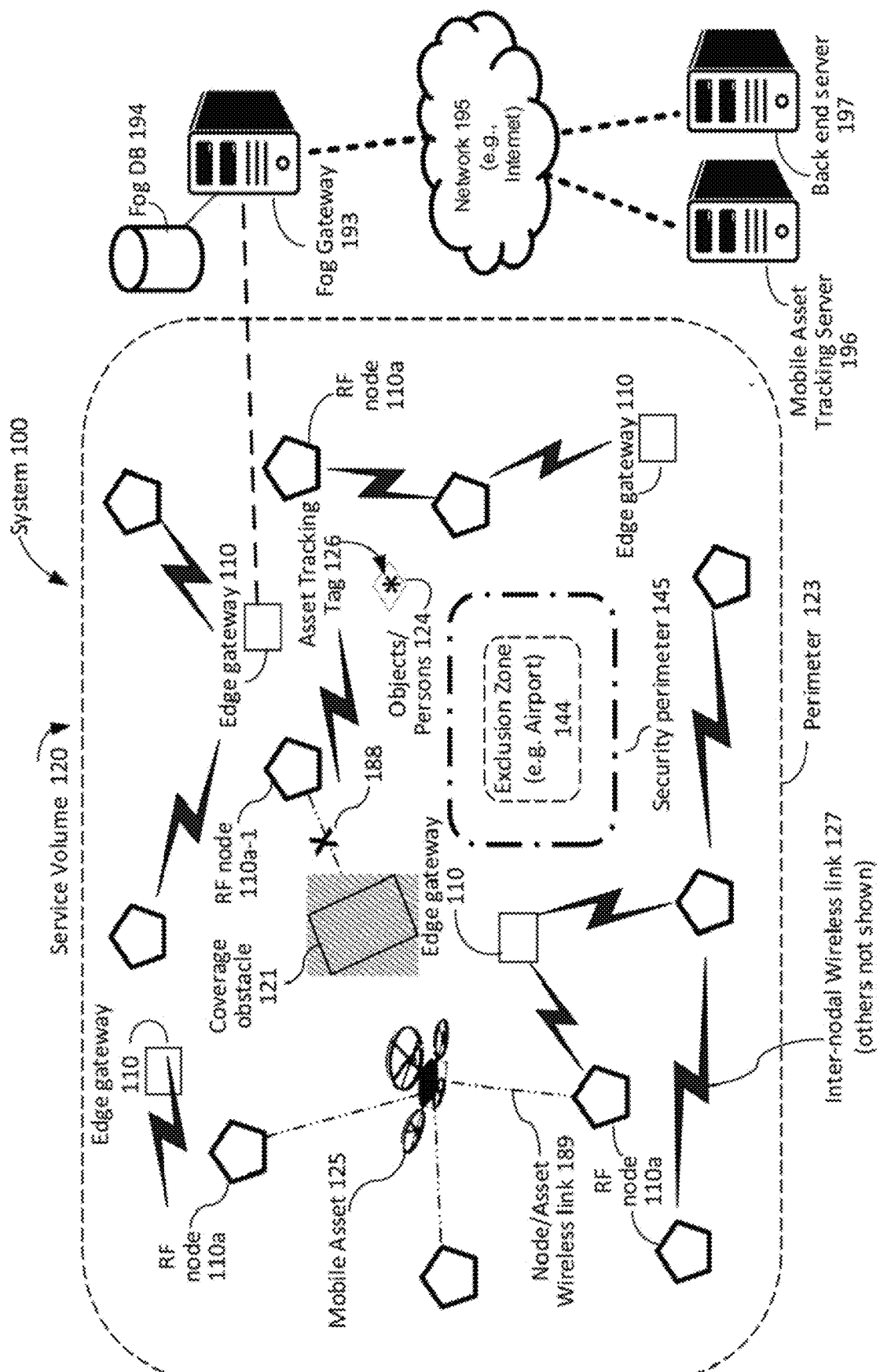
FIG. 1 illustrates an example of a system architecture for providing the three-dimensional asset tracking functionality in a hypothetical service volume shown from overhead.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "lighting device" as used herein is intended to encompass essentially any type of device that processes, generates, or supplies light, for example, for general illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. It is also possible that one or more lighting devices in or on a particular premises have other lighting purposes, such as signage for an entrance or to indicate an exit. Of course, the lighting devices may be configured for still other purposes, e.g. to benefit human or non-human organisms or to repel or even impair certain organisms or individuals. In most examples, the lighting device(s) illuminate a space or area of a premises to a level useful for a human in or passing through the space, e.g. regular illumination of a room or corridor in a building or of an outdoor space such as a street, sidewalk, parking lot or performance venue. The actual source of light in or supplying the light for a lighting device may be any type of light emitting, collecting or directing arrangement. Where the source is driven by electrical power, the light source typically will be in a lamp, light fixture or other luminaire. Other elements of the device, such as the processor and transceivers of an intelligent lighting device, may be part of the luminaire that contains the light source or may be implemented somewhat separately and coupled to operate the light source in the luminaire.

The term "mobile asset" may be a device, such as an automobile, a ground-based robotic device, a bus, an unmanned aerial vehicle, a user's mobile device, or that like that itself includes a radio frequency transmitter that can operate as an RF asset tag, or a mobile asset may be a box or the like on a shelf in a warehouse, a wheelchair, cart or some other movable/portable object having a radio frequency-enabled asset tracking tag coupled thereto. An "asset tag" or "asset tracking tag" may be any device capable of (a) detecting RF node signals and/or (b) emitting signals detectable by RF nodes, e.g. for location estimation and/or tracking purposes. For ease of further discussion, the following description often uses the term asset tag to encompass a special purpose wireless device coupled to an object as well as the RF equipment included in a vehicle, mobile device or the like.

A "node service volume" may be, for example, the volume within which a given RF node may reliably interact with a radio frequency mobile asset (e.g. within which greater than 50% of RF communications from a tag may be received). In an example, the service volume is the total volume within which the one or more RF nodes in the network can interact with a wireless asset tag.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Light output from the lighting device may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output from the device.

Reference now is made in detail to the examples illustrated in the accompanying drawings and discussed below.

The use of multi-element antenna arrays in the RF enable network nodes and attendant processing of attribute values determined from an asset tag signal received through multiple antenna elements facilitates three-dimensional location estimation with improved accuracy. An advantage of the disclosed system is the capability to track uniquely identified mobile assets in three-dimensions throughout an extended outdoor and/or indoor service spatial volume. Different classes of assets may be tracked and distinguished (e.g., car fleets, drone fleets, drone or car fleets separated by client or functional sub-class). Asset behavior can in various examples be characterized, flagged, and directed (e.g., in response to time, weather, traffic, emergencies). Various analytics may also be derived from asset behaviors. In some examples, location modalities other than or additional to RF node signaling (e.g., optical signaling, GPS) provide asset location data that may be collected through the network and/or ancillary communications capabilities (e.g., the cell network).

FIG. 1 illustrates an example of a system architecture for providing the three-dimensional asset tracking functionality in a hypothetical service volume as shown from overhead. The architecture of the system 100 shown in FIG. 1 includes a number of radio-frequency (RF) nodes 110a, a number of edge gateways 110, and a fog gateway 193 that communicate with one another to support location estimation and tracking services for mobile assets within the service volume 120. The RF nodes 110a may be configured in a network with the number of edge gateways 110. The number of edge gateways 110 may be less than the number of RF nodes 110a. Although shown separately, the functionalities of the edge gateways 110 may be incorporated into a subset of the RF nodes 110a. The fog gateway 193 may communicate through a secondary network 195 (e.g., the Internet) with a computational back end, such as a mobile asset tracking servicer 196, a backend server 197, or both.

The RF nodes 110a and the edge gateways 110 in the example are located within the service volume 120. The RF nodes 110a may be configured to detect radio frequency beacon signals transmitted via a node/asset wireless link, such as shown at 189, by the radio frequency-enabled mobile asset 125 when operating within service volume 120. Examples of a mobile asset 125 include unmanned aerial vehicles or drones, automobiles, or the like. In addition, an asset tracking tag 126 that is locatable by the system 100 may be coupled to movable objects and persons 124 thereby enabling the person or object with the tag 126 to be located and/or tracked. An object or person 124 coupled to an asset tracking tag 126 may also be referred to as a mobile asset.

In the illustrated example of FIG. 1, the operational extent of the service volume 120 may be indicated by the perimeter 123, and may include a coverage obstacle 121, such as building or a source of radio frequency interference, and an exclusion zone 144, such as an airport or other restricted area (e.g. government complex, protected wildlife habitat or the like) as well as other features within the perimeter 123. The coverage obstacle 121 may, for example, be a tall building that may block or attenuate RF signals 188 between a given RF node 110a-1 and mobile assets, such as mobile asset 125, on the side of the building opposite the given RF node 110a-1. The exclusion zone 144 may have a security perimeter 145. The service volume 120 within the perimeter 123 may be an airport, an urban area, a suburban area, a nature preserve, or a large indoor space.

The mobile assets 124, 125 may be configured to transmit an RF signal in a first frequency band that is receivable by one or more of the RF nodes 110a. The mobile asset location estimation and mobile asset tracking functions may use, for example, Bluetooth Low Energy (BLE) or other radio-frequency (RF) protocols. For example, the transceivers in the system 100 may operate in one or more frequency ranges, such as the 850-900 MHz range, 2.4. MHz, 5.8 MHz or the like. In another example, the RF nodes 110a may be mounted separately within service zone 120 or may be collocated with light fixtures (e.g., traffic light, streetlights, stadium lighting, airport obstruction lights or the like) within a service zone 120 in which the system 100 provide supports location estimation and/or mobile asset tracking service.

In an example, the physical locations of the RF nodes 110a within the service volume 120 are known to a computational capable device (e.g., edge gateway 100, fog gateway 193, mobile asset tracking server 196, or backend server 197) of the system 100, and these known physical locations may be used by the system 100 to derive locations for mobile assets 125 (e.g., asset tracking tags 126 borne by cars, drones, cell phones, packages, persons or other assets or devices that have RF capabilities installed by original equipment manufacturers, such as cars, drones, cell phones or the like) that receive or exchange signals with the RF nodes 110a. For example, the physical locations of the RF nodes 110a within the service volume 120 may be stored in a memory, such as the fog database (DB) 194 that is coupled to the fog gateway 193. Alternatively or in addition, the physical locations of the RF nodes 110a within the service volume 120 may be stored in a memory or database associated with the network 195, the mobile asset tracking server 196 or the backend server 197.

The network of RF nodes 110a (e.g., BLE transceivers integrated with light fixtures) of system 100 may be a deployed over the service volume 120 to provide radio frequency coverage within the service volume 120. The RF nodes 110a may communicate wirelessly with each other, for example, via inter-nodal wireless links 127 in a topologically connected network. The RF nodes 110a may be deployed in an approximately ground surface-following manner over the service volume 120 but the service volume 120 may be extended vertically to an extent as described with reference to FIG. 2.

In some examples, the RF nodes 110*a* may be distributed throughout the service volume 120 in a manner to provide service even where some RF nodes 110*a* may have attenuated or limited signal transmission range in a particular direction. One or more of the RF nodes 110*a* may communicate with an edge gateway 110. The edge gateway 110 may, via communication with the fog gateway 193, enable information to be exchanged between the network of RF nodes 110*a* and a server, such as mobile asset tracking server 196 or back end server 197. The fog gateway 193 and the server typically communicate via a network 195 such as the Internet. Information sent to the network through the gateway can include, for example, firmware updates, RF node configuration parameters, and ID updates for asset tracking tags. Information uploaded through the gateway can include, for example, tag location data and RF node performance data. Depending on which device processor will perform various data processing steps to generate a location estimation related to a particular tag or asset, data communications through the gateways and network(s) may involve transmissions of signal attribute values or related information (e.g. difference values) and/or asset tag identifiers or related information.

Figure 2:
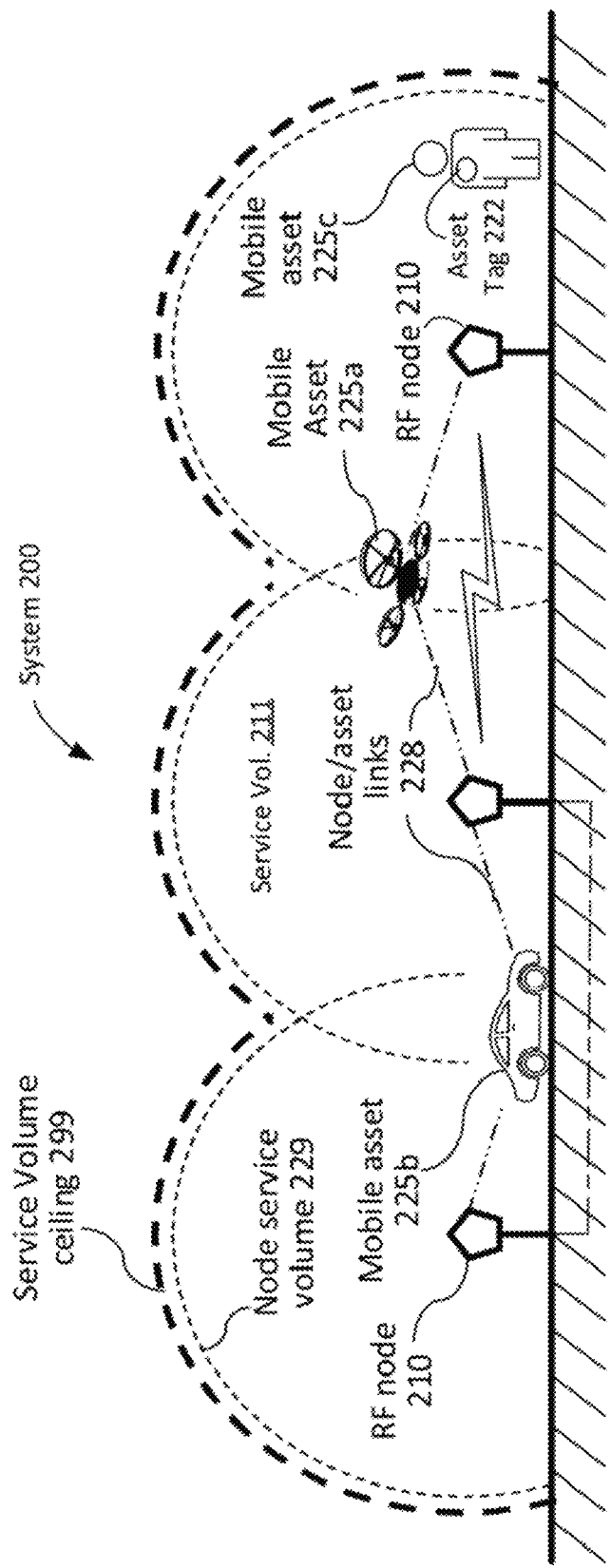
FIG. 2 shows a partial cross-sectional view depicting the three-dimensional nature of the service volume in the system architecture example of FIG. 1.

FIG. 2 is a partial vertical cross-section view depicting the three-dimensional nature of a service volume, such as 120 of example of FIG. 1. In some examples, the network of RF nodes 110*a* may be topologically disconnected sub-networks that communicate via local gateway devices, such as edge gateways 110, with the larger network (of RF nodes 110*a*) or directly with a computational device, such as fog gateway 193, or a computational back end, such as the mobile asset tracking server 196, or the back end server 197. The network of RF nodes 110*a* may include both stationary nodes shown by the pentagons in FIG. 1 and mobile (e.g., drone-borne) nodes.

As mentioned above, the service volume 120 may extend vertically above the respective RF nodes 110*a*, edge gateways 110, coverage obstacle 121, exclusion zone 144 and other structures within the service volume 120. FIG. 2 shows a partial vertical cross-section to depict a three-dimensional nature of service volume in the system architecture example of FIG. 1.

The system 200 of FIG. 2 may be implemented within a service volume 211. The service volume 211 may include indoor volumes (e.g. shopping malls, parking garages, warehouses, big-box, retail stores, tunnels or the like); outdoor volumes, e.g., a parking lot, a shipping holding area, an airport, an urban area and the space above the urban area (e.g. city streets, city parks and the like); or the like up to some defined service volume ceiling (i.e. height above ground or altitude) 299. For example, the service volume 211 may be limited to a ground area that approximately corresponds to the perimeter 123 of the service volume 120 of FIG. 1, and the service volume ceiling 299 may be limited by the receive power capabilities and/or antenna configuration of the respective RF nodes 210.

As shown in FIG. 2, each RF node 210 may have an approximately spherical radiation pattern (shown as node service volume 229) enabling a respective node 210 to send and receive signals from tags in the approximately spherical node service volume 299. The network of RF nodes 210 can thus communicate with mobile assets 225*a*, 225*b* and 225*c* (generally, referred to as 225) including tags throughout the three-dimensional service volume 211. The extent of the service volume 211 may be limited by the locations of RF nodes 201 and the respective node service volume 229 of each of respective RF node 210. The respective node service volumes 229 preferably overlap so that two or more nodes RF 210 can interact with a mobile asset at most points in the service volume 211 of the system 200.

Of course, each ideally spherical node service volume 229 for each respective node 210 may be, in practice, modified by the physical environment in which a respective RF node 210 is located. A node service volume 229 may include signal-blocked structural features (e.g., parking garages, tunnels, store interiors, RF shielding materials (intentional or unintentional), or the like). For example, a tall building (i.e. such as coverage obstacle 121 of FIG. 1) may block RF signals between a given RF node 210 and mobile assets on the side of the building opposite the given RF node within the service volume 211.

In addition, as shown in and described in the discussion of FIG. 1, the service volume 211 may also have zones of special concern that are defined within the service volume 211, such as the exclusion zones 144 of FIG. 1. In an example of three-dimensional zoning, ground vehicles and airborne drones may be excluded from an exclusion zone, such as 144 of FIG. 1. The approach of a mobile asset, such as 225, to within a certain distance of the exclusion zone may produce a warning and/or request for corrective action. For example with reference to FIGS. 1 and 2, the airborne mobile asset 225*a* may move to a location at or in close proximity to the security perimeter 145 of the exclusion zone 144, and in response, a warning message may be transmitted to the mobile asset for delivery to the asset operator warning of the mobile asset's proximity to the exclusion zone. The warning message may include a request for the mobile asset to change course away from the exclusion zone 144. The warning message may, for example, be produced by a computing device, such as the fog gateway 193, mobile asset tracking server 196 and the back end server 197 of FIG. 1, or the like. For example, response logic executed in the computing device can respond in a staged manner based on criteria including concentric spatial zones, device class, asset path and speed, state of alert, time of day, weather, and other. In an example of a three-dimensional exclusion zone, aerial drone mobile assets may be warned when flying below a certain altitude over sidewalks and other rights of way. In an example of a dynamically changing exclusion zone, mobile assets are warned of the approach of an emergency vehicle and directed out of its path.

It may be helpful to describe the respective individual component parts that may form the systems 100 and 200 described above with respect to FIGS. 1 and 2.

FIG. 3 illustrates a lighting device 10, such as a light fixture or the like, that includes a light source and one or two wireless transceivers. The lighting device 10 may be used as an RF node, such as RF nodes 110*a*, and be installed within a light fixture located within a system, such as 100 or 200.

The emitter or emitters forming the light source may be any suitable type light emitting device, such as various forms of incandescent, fluorescent, halide, halogen, arc, or neon lamps. In many examples of a fixture like 10, the emitters are solid state light emitters, just a few examples of which include electro luminescent (EL) devices, various types of light emitting diodes (LEDs), organic light emitting diodes (OLEDs), planar light emitting diodes (PLEDs) and laser diodes. For purposes of further discussion, the light fixture 10 includes a light source formed by one or more lighting emitting diodes indicated collectively by the element labeled LED 11 in the diagram.

Although some light fixtures discussed in a system example later may have a single radio frequency (RF) type wireless transceiver, the example light fixture 10 includes two RF wireless transceivers 13 and 15. All fixtures will have at least one transceiver, but possibly not the second transceiver; therefore the transceiver is indicated in dashed lines as a possibly optional component of the light fixture 10. For example, a fixture 10 configured as both a node and an edge gateway may have and utility both transceivers 13 and 15 (unless one transceiver, e.g. 5G cellular, can implement both types of communication). Fixtures operating only as nodes may use only one transceiver. For the node-only fixtures, there may be no second transceiver, or there may be a built in second transceiver that might be used in case of a need to reconfigure a particular node to assume the function of an edge gateway (e.g. in the event of a failure of another light fixture that previously operated as an edge gateway).

In the example, the first wireless transceiver 13 is of a first type, e.g. a Bluetooth Low Energy (BLE) transceiver, configured to communicate over a first radio frequency band. The first wireless transceiver 13 is coupled to a non-coplanar antenna array 12. The first wireless transceiver 13 and non-coplanar antenna array 12 may be configured to operate as a mobile asset detection device 14. The non-coplanar antenna array 12 may, for example, include multiple discrete antenna elements in which at least one of the multiple antenna elements is in a different plane than the other antenna elements of the array, in this configuration, the non-coplanar antenna array 12 may also be referred to a multi-element antenna array 12. The number of discrete antenna elements forming the multiple discrete antenna elements may be three or more discrete, non-coplanar antenna elements. In addition, the mobile asset detection device 14 may, as discussed in more detail with reference to another example, utilize a transceiver and a processor on board the light fixture 10 as a detection transceiver and a detection processor, respectively.

The second wireless transceiver 15 is of a second type, e.g. a WiFi transceiver, different from the first type (BLE) of transceiver; and the second wireless transceiver 15 is configured to communicate over a second radio frequency band. The second radio frequency band (for WiFi in the example) at least partially overlaps the first frequency band (for BLE in the example). For example, BLE or other Bluetooth signals use frequencies between 2.4000 GHz and 2.4836 GHz (the "2.4 GHz band"), while WiFi signals are broadcast using frequencies in three 22-MHz-wide sub-bands spaced out within the 2.4 GHz band. BLE and WiFi are used here by way of non-limiting examples only. Other examples of suitable transceivers include 3G, 4G or 5G cellular transceivers, Zigbee transceivers, sub-gigahertz (e.g. 900 MHz) personal area network (PAN) transceivers, or the like.

The light fixture 10 also includes a driver 16 configured to supply power to and control operation of the light source, in this example, the LEDs 11. As discussed more later, the example driver 16 draws power from an external source, such as alternating current (AC) mains 17 and provides direct current (DC) to power the LEDs 11. Alternatively, the AC mains 17 may be replaced with or supplemented with a DC source, such as a solar power source, wind source or the like. The example driver 16 may be an intelligent type device in that it is programmable and interfaces with additional components in the light fixture 10. One aspect of such a driver is that the driver 16 provides a data bus 18 coupled to support an exchange of data with and for other components of the fixture 10. In the light fixture 10, the data bus 18 supports exchange of data to and from the wireless transceivers 13 and 15. The data exchange over the data bus 18 may be between the wireless transceivers 13 and 15 or between the driver 16 and either one of the wireless transceivers 13 and 15.

Depending on the driver and bus design, the fixture components coupled on the data bus 18 use a suitable protocol to exchange data, commands, etc. For example, the driver 16 may poll the other components on the data bus 18, and the other components will respond by sending any data ready for communication over the bus 18 back over the bus to the driver 16. If intended for the driver 16, the driver 16 itself processes the data (consumes the data). If the data received by the driver 16 over the data bus 18 is intended for another component, the driver 16 sends the data over the data bus 18 in a manner logically addressed to the other fixture component.

Optionally, the light fixture 10 may include one or more sensors. By way of example, the drawing shows a single sensor 19. Examples of sensors relating to lighting control include various types of occupancy and ambient light sensors, a temperature sensor or light sensor coupled to the LEDs 11 to provide feedback, or the like. The sensor 19, however, may be a sensor of a type not necessarily used to control the lighting provided by the LEDs 11, such as an ambient temperature sensor, a vibration sensor, an air pressure and/or humidity sensor, a microphone or other audio input device, a still image or video image sensor, etc. The driver 16 may control the light fixture operation, particularly the LEDs 11, in response to data received from the sensor 19 over the data bus 18; and/or the driver 16 may cause communication of sensor data to other equipment via the data bus 18 and either one or both of the wireless transceivers 13, 15. For example, occupancy sensing data from a sensor 19 may be sent to other lighting devices within range using the BLE wireless transceiver 13.

The components shown in FIG. 3 may be integrated into a single housing (e.g., in a luminaire) or distributed spatially to any extent that is compatible with successful bus signaling. For example, the light source 11 and possibly the driver 16 may be in the luminaire component and some or all of the other electronics 13, 15, 19 may be located separately and connected to the source 11 and possibly the driver 16 within the luminaire via the data bus 18.

In an operational example, a processor, such as a detection processor, may execute program instructions stored in the memory that configure the light fixture 10 to perform functions. The functions may include detecting a mobile asset within a service volume in response to receiving a signal emitted by the mobile asset, for example, via a node/asset wireless link 189 of FIG. 1 or the like. The processor may determine a value related to the emitted signal as received via each of the multiple discrete antenna elements; and output data based on the determined value related to the emitted signal as received via each of the multiple discrete antenna elements. The light fixture 10 or 10a may be further configured to determine differences between the respective determined values for inclusion in the outputted data.

To summarize the example, in a light fixture 10, the driver 16 communicates with a BLE wireless transceiver 13, a WiFi wireless transceiver 15, and optionally a sensor 19 via a data bus 18. Power is derived by the driver from an AC source 17 and supplied to the wireless transceivers 13, 15 and the sensor 19, via a DC bias on the data bus 18 or via a separate power and ground. The driver 16 also controls an LED light source 11. The data bus 18 conveys data to and from the wireless transceivers 13, 15, and from the sensor 19 to the driver 16. The data bus 18 also conveys commands and data from the driver to the other devices 13, 15, 19.

A variety of smart drivers for light sources or other devices may be used to implement the driver 16. It may be helpful to consider a simple/high-level example with respect to the block diagram of FIG. 4. In the example of FIGS. 3 and 4, the LED light source 11 includes a number of LEDs on a single drive channel. Although drivers with additional channels (e.g. for independently controllable sets of LEDS) may be used, for this example, any single-channel LED driver 16 that provides sufficient controllable power to drive the selected LEDs 11 may be used. The driver 16 includes one or more power supplies 20 that obtain power from AC mains 17. One such power supply circuit 21 provides DC power to drive the LEDs 11 to emit light for illumination purposes. In the example, the power supply circuits 20 include an additional or auxiliary (Aux) power supply 22. The auxiliary power supply circuit 22 provides power of an appropriate voltage and maximum current to provide power for other electronic components of the light fixture 10, such as the wireless transceivers 13, 15 and the sensor 19 in the example of FIG. 3. The auxiliary power may be provided over the data bus or over a separate power bus (shown as a dotted line arrow).

Examples of suitable drivers 16 are available from eldoLED B.V. The driver 16 may receive power from AC mains, 100V AC to 488V AC, e.g. 120V AC or 220V AC. The driver 16, for example, may be a multi-volt input device capable of driving the LEDs using power obtained from any AC source 17 in a range of 120V AC to 227V. It is also possible to implement the light fixture 10 with a low voltage DC power supply, such as a 24V supply. As another alternative, the light fixture 10 may use a battery, wind or solar power source, as an alternative or a backup to AC mains power. The circuitry of the light fixture 10 may be located remotely from a luminaire that contains the actual LEDs 11, so that only the LEDs are included in the luminaire, and a remotely located driver 16 would connect to the LEDs 11 to supply controlled current to drive the LEDs 11.

The driver 16 in the example also includes processor circuitry in the form of a central processing unit (CPU) 23 along with various memories one of which is shown at 24 for storing instructions for execution by the CPU 23 as well as data having been processed by or to be processed by the CPU 23. The memory 24, for example, may include volatile and non-volatile storage; and the program instructions stored in the memory 24 may include a lighting application (which can be firmware), in this example, for implementing the processor functions of the light fixture including light control functions as wells as communication related functions including some examples of the three dimensional location determination.

The driver 16 also may include an input interface 25 for suitable connection/communication of the driver 16 with other system elements, such as a light switch, dimmer or the like as a user input to control lighting operations. The driver 16 may also implement a clock (Clk) 27 for timing related functions. The clock 27 may be a specific circuit within the driver 16 or implemented as a program controlled function of the CPU processor 23.

The driver 16 also includes a data bus interface 28 coupled to the CPU 23. The data bus interface 28 is a circuit configured for connection to the wires or for coupling to another type media forming the data bus 18 and for providing appropriate signals over the media of the data bus 18 carrying data for the driver and for other fixture components on the data bus 18. In an eldoLED driver, the bus 18 is a two-wire bus and carries data in a proprietary code protocol. The data bus interface 28 in the driver 16 applies signals to such a bus in the protocol and senses signals on the bus in that protocol that have been applied by other fixture components on the particular media implementation of the data bus 18.

The two-wire bus and associated interface are described here by way of non-limiting examples only. It should be apparent that data busses using more than two wires, non-electrical (e.g., optical) busses, and wireless busses may be used in a light fixture 10; and for such alternate bus implementations, the driver 16 would have a corresponding alternate implementation of the data bus interface 28.

The driver 16 may be implemented as a suitable chip set or may be implemented as a single microchip device. In a single chip example, the power supplies 20, the CPU 23, the memory 24, the input interface 26, any circuitry of the clock 27, and the data bus interface 28 are all included on a single chip and sometimes referred to as a "system on a chip" or SoC implementation of a driver.

Figure 5:
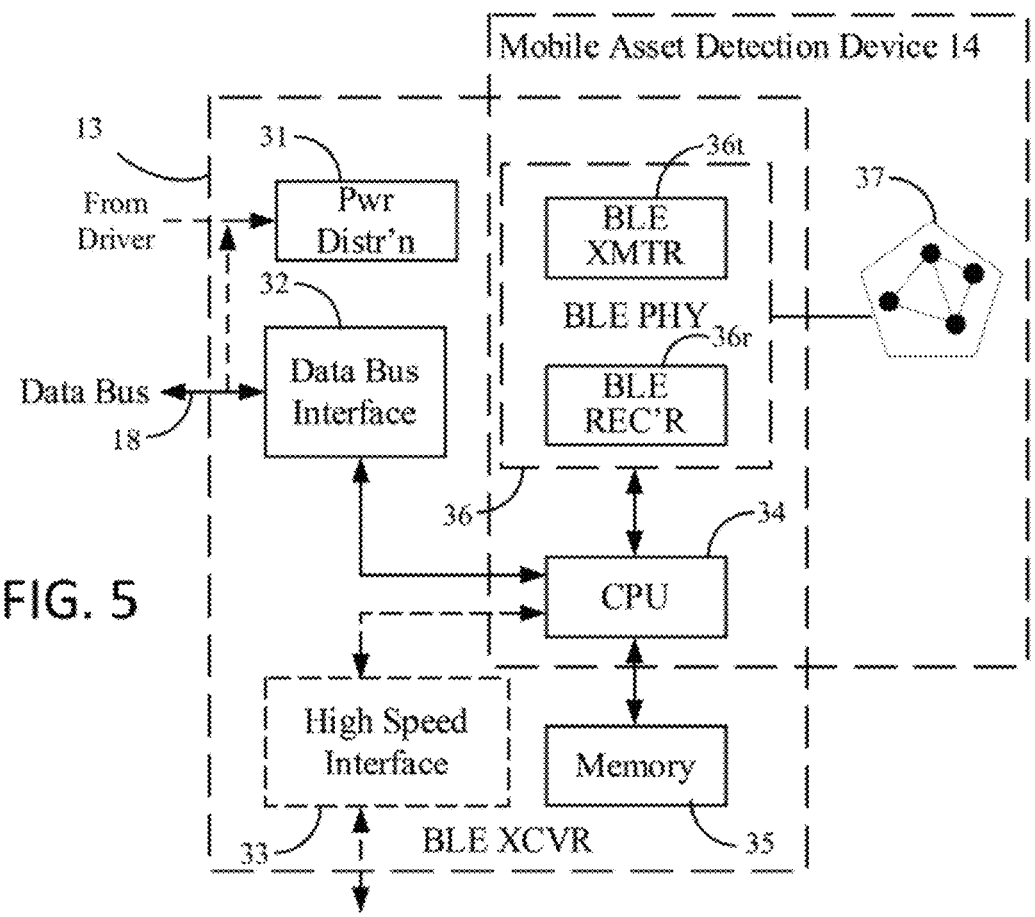
FIG. 5 and FIG. 6 are simplified, functional block diagrams of two examples of transceivers that may be used in the example light fixture of FIG. 3.
Figure 6:
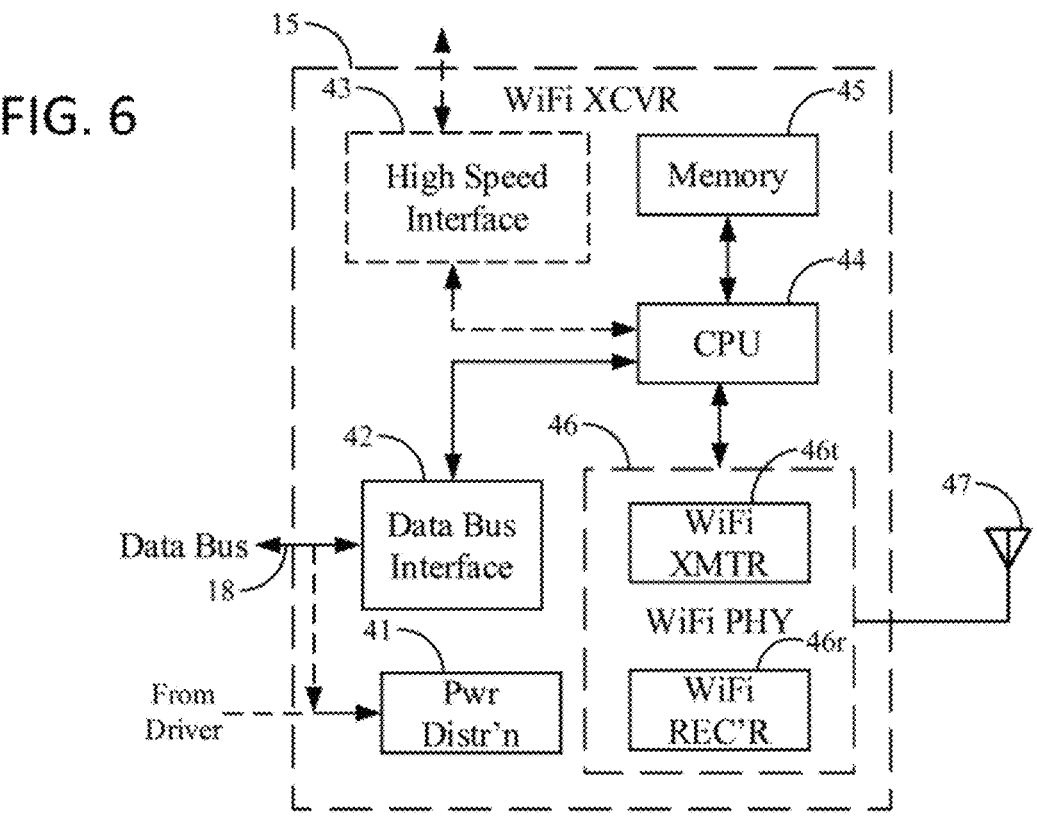

Although additional transceivers may be included, the example light fixture 10 includes two transceivers of different types communicating over radio frequency bands that may be the same but at least somewhat overlap. Typical examples of radio-frequency wireless transceivers suitable for lighting device or lighting system applications include WiFi transceivers; BLE or other Bluetooth transceivers; third-generation (3G), fourth-generation (4G), fifth-generation (5G) or higher cellular transceivers, Zigbee transceivers, sub-gigahertz (e.g. 900 MHz) personal area network (PAN) transceivers, or the like. For purposes of discussion of a specific example, the fixture 10 of FIG. 3 includes a BLE type wireless transceiver 13 and a WiFi type wireless transceiver 15. Such example transceivers may be built in a variety of different configurations. It may be helpful to consider simple/high-level examples of two different types of transceivers with respect to the block diagrams of FIGS. 5 and 6. BLE and WiFi are used here by way of non-limiting examples only. FIG. 5 illustrates an example of the BLE type wireless transceiver (XCVR) 13, and FIG. 6 illustrates an example of the WiFi type wireless transceiver (XCVR) 15.

The BLE wireless transceiver 13 of FIG. 5 includes power distribution circuitry 31, which draws power from the driver 16 (FIGS. 3 and 4), via the data bus 18 (or optionally via a separate power bus shown as a dotted line arrow). The power distribution circuitry 31 converts the received power to one or more voltages and/or current levels suitable to power the various electronic circuits of the BLE wireless transceiver 13. The WiFi wireless transceiver 15 of FIG. 6 includes power distribution circuitry 41 that similarly draws power from the driver 16 and converts the received power to one or more voltages and/or current levels suitable to power the various electronic circuits of the WiFi transceiver 15. In the examples of FIGS. 3 to 5, the driver 16 provides power, which typically involves a wired connection. Where the data bus 18 is wireless (e.g. RF or optical), there may be no such connection, in which case one or both transceivers may draw power from another source (not shown).

The BLE wireless transceiver 13 includes a data bus interface 32, and the WiFi wireless transceiver 15 includes a data bus interface 42. The data bus interfaces 32, 42 of the transceivers are generally similar to the data bus interface 28 of the driver 16 (FIG. 5), in that each of the interfaces 32, 42 is a circuit configured for connection to the wires or coupling to other type media, forming the data bus 18. The data bus interface circuits 32, 42, like the data bus interface 28, also are configured for providing appropriate signals over the media of the data bus 18 carrying data from the respective wireless transceiver 13 or 15 and for sensing data signals on the data bus 18 to recover data for use by the respective wireless transceiver 13 or 15.

The BLE wireless transceiver 13 may also incorporate the mobile asset detection device 14. The BLE receiver 36r may be configured to process RF beacon signals received via the multi-element antenna array 37. The mobile asset detection device 14 as discussed above may use processors on board the BLE wireless transceiver 13, such as CPU 34, to perform functions of the detection processor. For example, CPU 34 in addition to being configured to function as a processor for performing BLE protocol and communication functions, may be further configured to perform functions related to the detection of a mobile asset within a service volume.

Optionally, the BLE wireless transceiver 13 may include a high speed data interface 33, and the WiFi wireless transceiver 15 may include a high speed data interface 43. If included, such additional interfaces 33, 43 would be configured to provide high speed data exchange over a suitable higher speed data bus media (not shown), for example, between the respective wireless transceivers 13, 15, e.g. for any application involving exchange of data in which the transceivers support two types of radio communications at data rates higher than available over the data bus 18 provided by the driver 16.

The illustrated example transceivers 13, 15 are smart devices in that they include processor and memory capabilities for programmed operational control and data processing. Hence, the BLE transceiver 13 includes a central processing unit (CPU) 34 and one or more memories shown collectively at 35 storing program instructions (which can be firmware) and configuration data, for implementing communications and any other operations, such as mobile asset detection, to be implemented by the logic of the transceiver 13. Similarly, the WiFi transceiver 15 includes a central processing unit (CPU) 44 and one or more memories shown collective at 45 storing program instructions (which can be firmware) and configuration data, for implementing communications and any other operations to be implemented by the logic of the transceiver 15. The circuitry of the CPUs may be thought of as individual processors configured upon execution of program instructions from the respective memories.

Each wireless transceiver 13 or 15 also includes physical (PHY) layer circuitry including components for transmitting and receiving RF wireless signals carrying data and associated circuitry interfacing to the respective CPU for exchange of the data and for receiving operational control instructions from the respective CPU. Although other circuitry such as digital signal processors, analog-to-digital and digital-to-analog converters, filters and amplifiers may be included; for simplified illustration purposes, the BLE PHY circuitry 36 and the WiFi PHY circuitry 46 are shown as including respective transmitters and receivers. Hence, the BLE PHY circuitry 36 includes a BLE transmitter 36t and a BLE receiver 36r; and the WiFi PHY circuitry 46 includes a WiFi transmitter 46t and a WiFi receiver 46r.

Each PHY circuitry connects to one or more antennas in or coupled to the respective transceiver. Hence, the BLE PHY circuitry 36 connects to a multi-element antenna array 37 that is specifically configured with multiple discrete antenna elements at least one of which is non-coplanar with the other discrete antenna elements of the antenna array 37. The antenna array 37 is also configured for two way wireless communication in the BLE frequency band. Similarly, WiFi PHY circuitry 46 connects to one or more antennas (collectively shown as one antenna 47) specifically configured for two way wireless communication in the WiFi frequency band.

Each of the transceivers 13, 15 shown by way of examples in FIGS. 5 and 6, may be implemented as a system on a chip (SoC), although they could be implemented as more separate individual components, with each illustrated component formed of one, two or more interconnected chips. Alternatively, the two transceivers might be implemented on a single combined system on a chip, for example, incorporating the different PHY circuits for BLE and WiFi but including only one set of the other components (e.g. the CPU, memory, bus interface).

Each transceiver 13 or 15, in the example, includes programming in a memory 35 or 45. At least a portion of the programming configures the CPU (processor) 34 or 44 to control communications over a respective wireless communication frequency band using the applicable protocol.

In this way, the two PHY layer circuits 36, 46, as controlled by the associated processors (CPUs) 34, 44, are configured to communicate over two frequency bands defined by the respective protocol standards, in this case by the BLE standard and the WiFi standard respectively. The bands, however, are not entirely separate and overlap at least to some degree as specified in the two otherwise different standards.

The auxiliary channel functions as a general purpose data "bus," meaning that all attached devices share the channel physically at all times; thus, a signal placed on the data bus 18 by any device 16, 13, 15 or 19 is detectable by any other device on the bus. The driver 16 also provides power, for example, via the data bus 18. In an example, the data bus 18 is a pair of conducting wires (FIG. 3), but buses having more than two wires, non-electrical (e.g., optical) buses, and wireless buses may also be used to implement data bus 18. All devices on the data bus 18 are equipped to send and/or receive signals via the data bus in a manner intelligible to other devices on the data bus 18. All of the devices on the data bus 18 have sufficient computational capability to execute commands received via the data bus 18 and/or to encode data for transmission via the data bus 18.

Figure 7:
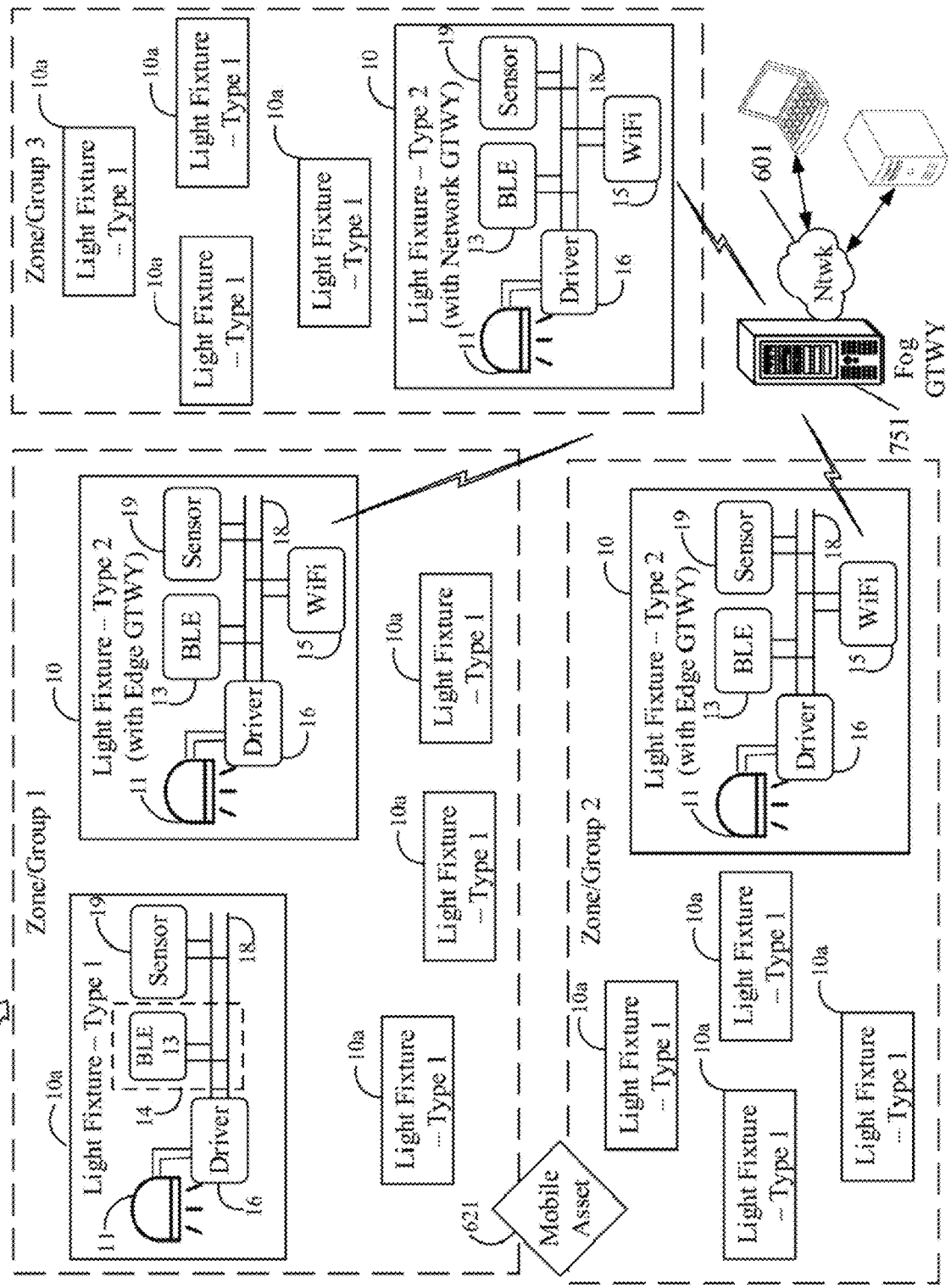
FIG. 7 is a simplified, functional block diagram of an example of a system of lighting fixtures and other equipment, where at least several of the light fixtures may be similar to the example light fixture of FIG. 3.

FIG. 7 illustrates a system 600 of wireless enabled light fixtures 10, 10a distributed about a space, for example, in or around a building at a premises. Each of the wireless enabled light fixtures 10 or 10a includes a light source such a LED source 11, a light source driver 16 having a power supply to drive the light source 11 and a data bus interface. Each wireless enabled light fixture 10 or 10a further includes a data bus 18 provided by the interface of the driver 16, and a first wireless transceiver coupled to that data bus 18. Although other types of wireless transceivers could be used as the first type of transceiver that is included in all of the fixtures 10, 10a; in the example system 600, the first transceiver is a BLE type transceiver 13 configured to communicate over a first radio frequency band, e.g. over the band specified in the BLE standard. When equipped with a BLE type transceiver 13, the light fixture 10 or 10a may be referred to as a radio frequency-enabled (RF-enabled) light fixture. Some or all of the light fixtures 10, 10a may include sensors 19.

In FIG. 7, the fixtures 10a are indicated as type 1 light fixtures in that they may only have one wireless transceiver, e.g. only the BLE transceiver 13. Alternatively, they may include additional transceivers, but those transceivers may be inactive (e.g. awaiting activation to reconfigure a type 1 fixture 10a as a type 2 fixture 10).

In the system example 600, each of two or more respective wireless enabled light fixtures, referred to as type 2 light fixtures 10, further includes a second wireless transceiver coupled to the data bus 18 provided by the interface of the driver 16 of the respective light fixture 10. The second wireless transceiver is of a second type different from the first type. Although other types of wireless transceivers could be used as the second type of transceiver in light fixtures 10; in the example system 600, the second wireless transceiver is a WiFi transceiver 15. Each second (e.g. WiFi) wireless transceiver 15 is configured to communicate over a second radio frequency band (e.g. the band allocated for WiFi) that at least partially overlaps the first frequency band.

The elements 11 to 19 of the light fixtures 10, 10a may be implemented by correspondingly numbered elements/circuits as described above relative to the example light fixture components in FIGS. 3 to 6.

The light fixtures 10, 10a of the system 600 are arranged to provide general illumination about a premises of operations. In the system 600, however, the light fixtures 10 having two active wireless transceivers 13, 15 may be configured for an additional communications related function. For example, each of the type 2 light fixtures 10 may have programming in a memory accessible to one of the processors of the fixture 10 configuring the respective light fixture 10 as an edge gateway with respect to a number of others of the wireless enabled light fixtures 10a. At a high level, in the BLE/WiFi example, light fixtures 10, 10a in a zone or group (three of which are shown by way of a non-limiting example) may communicate with each other via BLE. The lighting fixtures 10, 10a in a group in turn may be arranged to provide general illumination in a respective zone or area of the premises. The lighting fixtures 10 provide a gateway between the BLE based light fixture communications of the respective groups and a WiFi network that includes all of the type 2 light fixtures 10 and a fog gateway 751.

The system 600 in the example of FIG. 7 therefore also includes the fog gateway 751. An example of that gateway 751, discussed later with respect to FIG. 8, includes a wireless transceiver of the second type wireless transceiver (e.g. another WiFi transceiver) configured for wireless network communications with the respective wireless enabled light fixtures 10 using the second radio frequency band (e.g. the band allocated for WiFi). The fog gateway 751 also includes a data network interface for communication via a data network 601 with other computers 603, 605.

The data network 601 may be a local area network or a wide area network such as an intranet or the public Internet. The drawing shows a host or server type network connected computer 603 and a laptop type user terminal device 605 as non-limiting examples of external equipment that may communicate with the system 600 via the network 601 and the fog gateway 751, for various data gathering or control purposes.

As described in more detail later relative to FIG. 8, a processor in the fog gateway 751 may be coupled to the second type wireless transceiver of the fog gateway 751 and the data network interface. The fog gateway processor is programmed or otherwise configured to cause the fog gateway 751 to provide a gateway between wireless network communications via the second type (e.g. WiFi) transceivers of the respective wireless enabled light fixtures 10 using the second (e.g. WiFi) radio frequency band and the data network 601.

Edge gateway functionalities in light fixtures 10 may serve to translate messages received via BLE 13 from other light fixtures into communications suitable for exchange with the fog gateway 751, for example, via WiFi. The edge gateway functionalities in light fixtures 10 may serve to translate messages received from the fog gateway 751 over WiFi for communication to other light fixtures 10a over BLE.

The drawing shows an example of a mobile asset 621 at a location in the premises served by the system 600. Although not shown in this example, the mobile asset 621 includes circuitry, such as a BLE transmitter, an RFID transmitter or the like, with a unique mobile asset identifier that is detectable by the BLE transceiver and/or a sensor in the light fixtures 10, 10a.

The communications through the edge gateway functionalities of the light fixtures 10 may relate to lighting operations. Lighting related communications, for example, may include lighting related sensor data or light fixture status/health data to be sent upstream to the fog gateway 751. Non-lighting sensor data may be similarly sent upstream to the fog gateway 751. In the downstream direction from the fog gateway 751, lighting related communications, for example, may include lighting commands (e.g. turn ON LEDs 11, turn OFF LEDs 11, dimming or the like); configuration setting data (e.g. to define members of a control group, to designate a light fixture to act as a zone controller or as an edge gateway in a group, or the like); or software or firmware updates for the light fixtures 10, 10a and possibly for a wall controller 625.

For more information about asset tracking via a system like system 600, attention may be directed to U.S. patent application Ser. No. 15/916,861, filed Mar. 9, 2018, entitled, "Asset Tag Tracking System and Network Architecture," the entire disclosure of which is incorporated herein by reference. Although somewhat different types of transceivers are used for the wireless communications among light fixtures, more information regarding a protocol and procedures for wireless communications amongst light fixtures, wall switches, at least one gateway, etc. may be found in U.S. Pat. No. 9,883,570 issued Jan. 30, 2018, entitled "Protocol for Lighting Control via a Wireless Network," the entire disclosure of which is incorporated herein by reference.

The fog gateway 751 is configured for wireless data communication with the type 2 light fixtures 10 configured as edge gateways. For example, the fog gateway 751 may be configured with a WiFi radio frequency transceiver that is compatible with the WiFi radio frequency transceiver 15 of each of the light fixtures 10. Although the gateway 751 may use special purpose hardware, the example utilizes an appropriately programmed computer platform.

In an operational example, the system 600 may perform various functions to provide three dimensional location estimation services. For example, the mobile asset 621 may transmit a beacon signal containing the unique identifier of the mobile asset. The beacon signal may be compatible with the BLE transceiver 13 of the mobile asset detection device 14. The light fixture 10a may receive the beacon signal via the multi-element antenna array of the mobile asset detection device 14. The mobile asset detection device 14 as discussed herein may be configured to process the received beacon signals to determine a value related to an attribute of the received signal for each of the respective discrete antenna elements and extract the mobile asset's unique identifier from the received beacon signal. The mobile asset detection device 14 may further process and generate information related to the signal attributes and information related to the mobile asset's 621 unique identifier. For example, a processor (shown in other examples) of the mobile asset detection device 14 may be configured to generate information for a three dimensional location estimation based on the determined values related to the received signal attribute as received by the discrete antenna elements. The light fixture 10*a* may forward the generated information, depending upon a configuration of the system 600 to a light fixture 10, which is functioning as an edge gateway, to the fog gateway 751, or both the edge gateway and the fog gateway. For example, the mobile asset detection device 14 may output a signal containing the information for three dimensional location estimation.

In an example, the fog gateway 751 may be configured to control the light fixtures 10 and 10*a*. The fog gateway 751 may further be configured to receive information related to the unique identifier of the mobile asset 621 and the information related to the determined values of the signal attribute via the fog gateway radio frequency transceiver (shown in the example of FIG. 8). The fog gateway 751 may determine differences between the determined signal attributes values of the radio frequency beacon signal received via the discrete antenna elements. The fog gateway 751 may send, via the data communication network 601, information related to the determined differences the radio frequency beacon signal received via the discrete antenna elements of the mobile asset and information related to the unique identifier to a server, such as 603. The fog gateway 751 may also be configured to receive signals containing the information for three dimensional location estimation from the radio frequency-enabled nodes. The information for three dimensional location estimation may, for example, include the differences between the respective determined values related to the received signal between each of the discrete antenna elements of the multi-element antenna array. The server 603 may be configured to receive information related to the determined differences of the radio frequency beacon signal and the information related to the unique identifier of the mobile asset sent via the fog gateway 751. The server 603 may be by programmed or otherwise configured to perform the three dimensional location estimation in response to the data based on the determined values of the signal attribute. The three-dimensional location estimate may be provided in Cartesian or polar coordinates with respect to the service zone, GPS coordinates with altitude indication, or some other form of three dimensional coordinate system. The server 603 may deliver the three dimensional location estimate to the fog gateway 751 or to the computer or laptop type user terminal 605. The fog gateway 751 or the laptop type user terminal 605 may be further configured to analyze the three dimensional location estimate with respect to maps, coordinates or some other data structure to determine whether the mobile asset 621 is authorized to be at the estimated location. In addition or alternatively, the determination may also be whether the estimated location of the mobile asset 621 is within a predetermined distance and/or altitude of an exclusion zone, e.g. 100 meters, an altitude of 2000 feet or the like.

Figure 8:
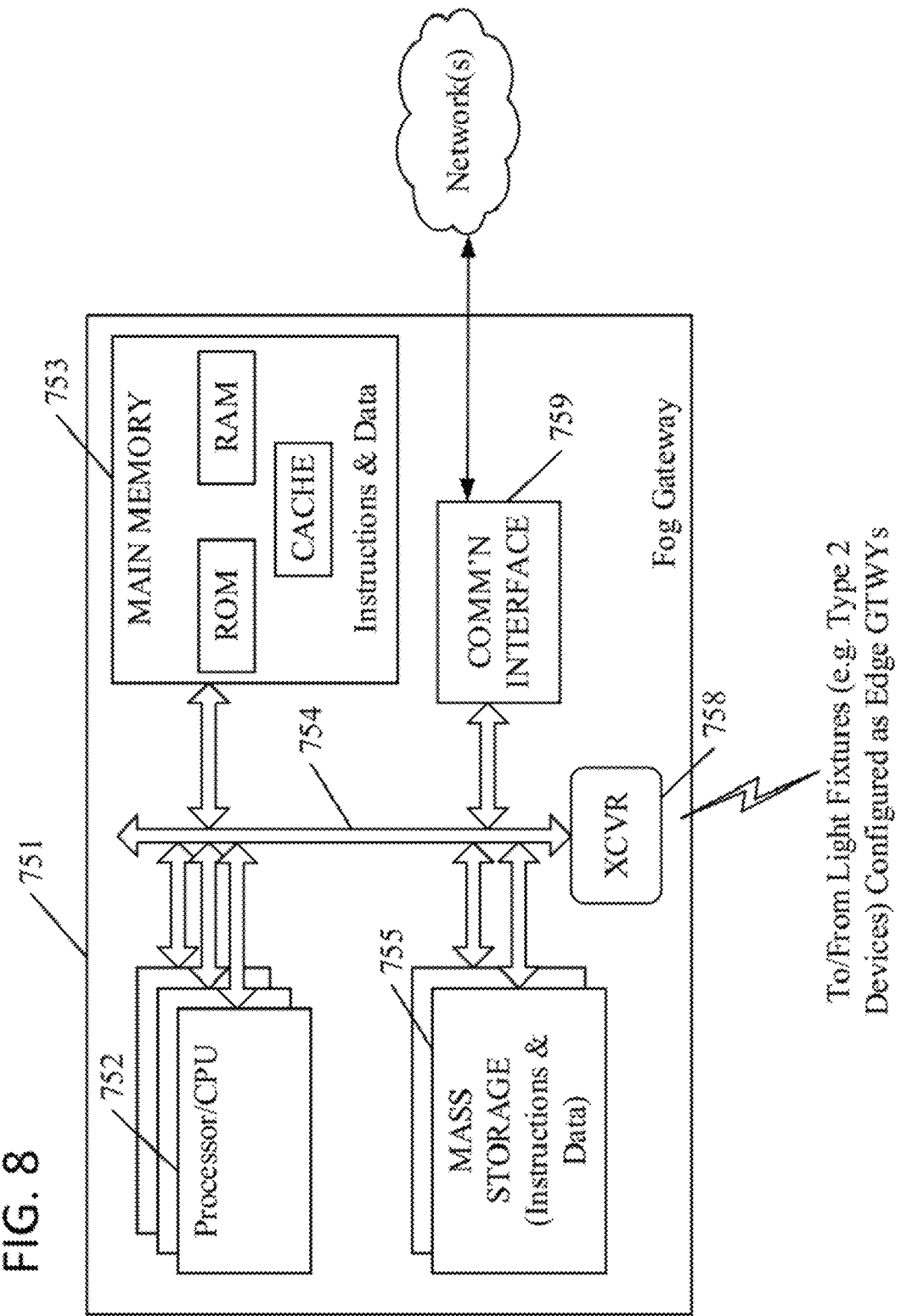
FIG. 8 is a simplified, functional block diagram of an example of a hardware platform for a fog gateway, as may be used in the example systems of FIGS. 1 and 7.

FIG. 8 is a functional block diagram of a general-purpose computer system 751, by way of just one example of a hardware platform that may perform the functions of the fog gateway. The example 751 will generally be described as an implementation of a server or host type computer, e.g. as might be configured as a blade device in a server farm or in a network room of a particular premises. Alternatively, the computer system 751 may comprise a mainframe or other type of host computer system capable of performing location determination services or the like via the network 601 and the on-premises WiFi network formed with type 2 light fixtures 10.

The computer system 751 in the example includes a central processing unit (CPU) 752 formed of one or more processors, a main memory 753, mass storage 755 and an interconnect bus 754. The circuitry forming the CPU 752 may contain a single microprocessor, or may contain a number of microprocessors for configuring the computer system 751 as a multi-processor system, or may use a higher speed processing architecture. The main memory 753 in the example includes ROM, RAM and cache memory; although other memory devices may be added or substituted. Although semiconductor memory may be used in the mass storage devices 755, magnetic type devices (tape or disk) and optical disk devices may be used to provide higher volume storage. In operation, the main memory 753 stores at least portions of instructions and data for execution by the CPU 752, although instructions and data are moved between memory 753 and storage 755 and the CPU 752 via the interconnect bus 754.

The computer system of the fog gateway 751 also includes one or more input/output interfaces for communications, shown by way of example as interface 759 for data communications via the network 601 as well as a WiFi type wireless transceiver 758. Each interface 759 may be a high-speed modem, an Ethernet (optical, cable or wireless) card or any other appropriate data communications device. The physical communication link(s) to/from the interface 759 may be optical, wired, or wireless (e.g., via satellite or cellular network). Although other transceiver arrangements may be used, the example fog gateway 751 utilizes a WiFi type wireless transceiver 758 similar to the WiFi type wireless transceivers 15 in the light fixture and component examples of FIGS. 3 and 6 described above. The WiFi type wireless transceiver 758 enables the fog gateway 75 to communicate over-the-air with the WiFi type wireless transceivers 15 in the edge gateways implemented in light fixtures 10 in the system 600 of FIG. 7.

Although not shown, the computer platform configured as the fog gateway 751 may further include appropriate input/output ports for interconnection with a local display and a keyboard and mouse or with a touchscreen or the like, serving as a local user interface for configuration, programming or trouble-shooting purposes. Alternatively, the operations personnel may interact with the computer system of the fog gateway 751 for control and programming of the system from remote terminal devices via the Internet or some other link via any network 601.

The computer system implementing the fog gateway 751 runs a variety of applications programs and stores various information in a database or the like for control of the fixtures, wall controllers and any other elements of the lighting system 600 and possibly elements of an overall building managements system (BMS) at the premises. One or more such applications, for example, might enable asset tracking, lighting control through the fog gateway and/or lighting control based on input from the sensors 19 or the wall controller 625.

The example FIGS. 7 and 8 show a single instance of a fog gateway 751. Of course, the fog gateway functions may be implemented in a distributed fashion on a number of similar platforms, to distribute the processing load. The hardware elements, operating systems and programming languages of computer systems like that of the fog gateway 751 generally are conventional in nature, and it is presumed that those skilled in the art are sufficiently familiar therewith to understand implementation of the present system and associated lighting control technique using suitable configuration and/or programming of such computer system(s).

Examples of the mobile asset detection device or system include an antenna array having multiple discrete antenna elements disposed in a non-coplanar arrangement on or within an RF node as well as capabilities for measuring properties (e.g., differential time of arrival) of RF signals sensed by a processor coupled to the multi-element antenna array. Differences in time of arrival of a signal at the multi-element antenna may be used to estimate the direction from which the signal has come (i.e., the bearing of the signal's source). Thus, in an example, a streetlight luminaire equipped with the mobile asset detection device according to an example may be configured to estimate the bearing and/or range of a mobile asset, such as an airborne drone, transmitting appropriate RF beacon signals in the vicinity of the streetlight luminaire. The principles of such estimation are described below.

Figure 9:
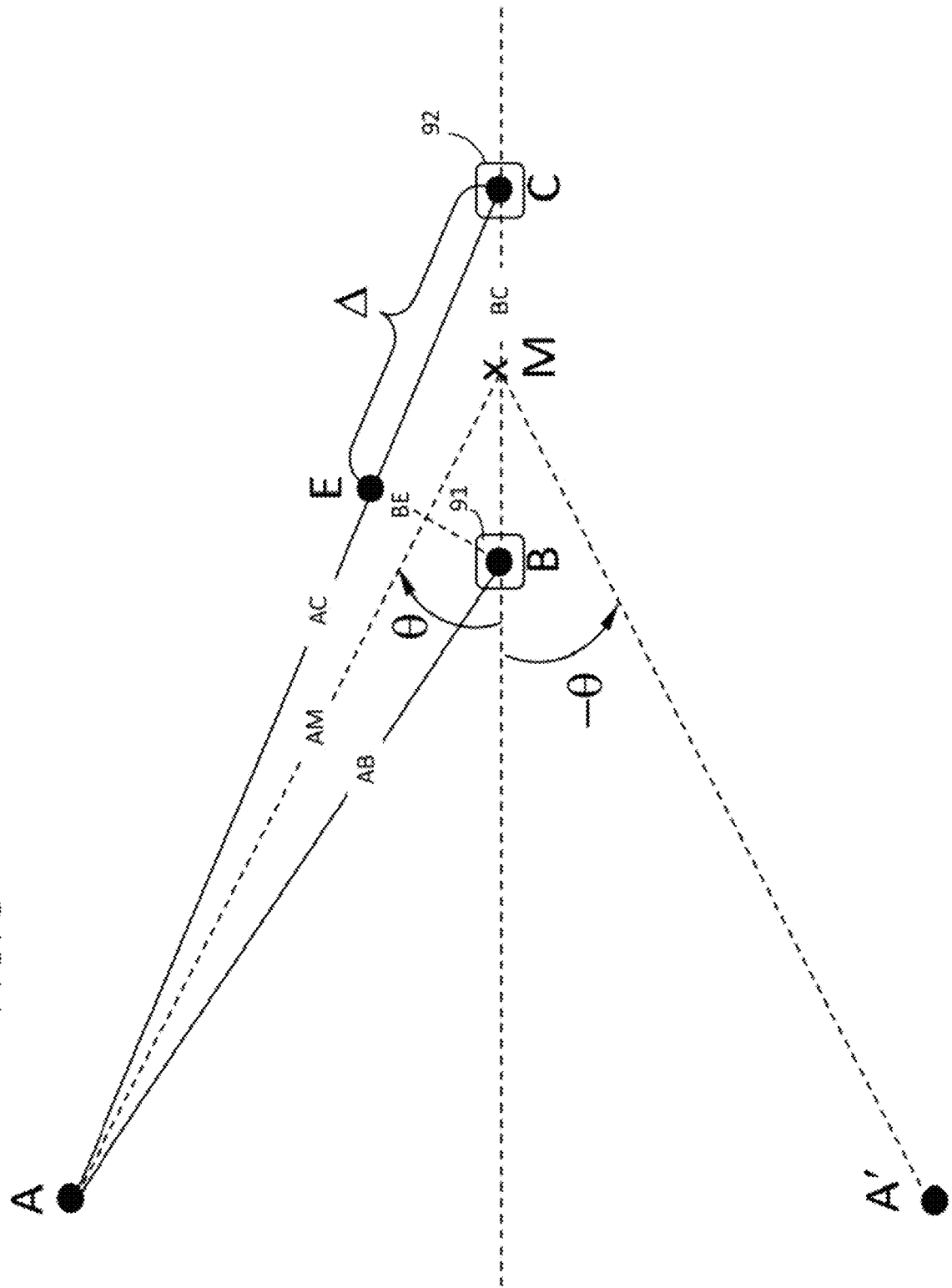
FIG. 9 illustrates an example of an estimation of the bearing of a signal source using two antenna elements in a plane.

FIG. 9 illustrates an example of an estimation of the bearing of a signal source using two antenna in a plane. In order to understand the benefit of estimating a location in three dimensions, it may be helpful to understand the concepts for making a two-dimensional location estimate. First principles of a location estimation in two dimensions are shown in FIG. 9. Depicted in FIG. 9 is the transmission of a radio signal from an RF source, such as RF node 110a of FIG. 1, at point A to an antenna array (shown as rounded squares) with discrete antenna elements 91 and 92 at points B and C, respectively. The radio signal may be a beacon signal from a mobile asset. Each antenna element 91 and 92 receives the beacon signal.

In the example of FIG. 9, the direction or bearing of the RF source at point A is defined as the angle θ between the line segment BC connecting the two antenna elements 91 and 92, and the line AM connecting point A with the midpoint M of the line segment BC connecting the antenna elements 91 and 92. The RF signal(s) from the RF source at point A reach antenna element 91 at point B by path AB and reach antenna element 92 at point C by path AC. If line BE is drawn to make an isosceles triangle ABE, then path AB is shorter than path AC by a distance Δ. Thus, the signal from the RF source at point A may reach antenna element 91 at point B more quickly than it reaches antenna element 92 at point C, the time-of-arrival difference being Δ/cm seconds (where cm is the speed of light in the ambient medium, e.g., air). This time-of-arrival difference is also termed a "phase difference," and may be measured by comparing the output signals of antenna element 91 at point B and antenna element 92 at point C.

Since the length and orientation of line segment BC are known, the bearing θ may be calculated from the phase difference Δ/cm. (In this discussion, all antenna are for simplicity presumed to be point-size, and the distance from the source to the antenna is presumed to be much larger than the distance between the antenna elements 91 and 92. Given these assumptions, Δ/cm is effectively independent of range and uniquely determines the bearing θ. These assumptions will hold usually and approximately for all the disclosed examples.

However, in FIG. 9, it is clear by symmetry that a signal from an RF source at point A' having a bearing −θ would also arrive at the antenna element 91 at point B and antenna element 92 at point C with a phase difference Δ/cm. Therefore, two antenna elements, such as 91 and 92, do not suffice to uniquely estimate a location of an RF source in two dimensions. In order to uniquely estimate a location of an RF source, an additional antenna element would be advantageous.

Figure 10:
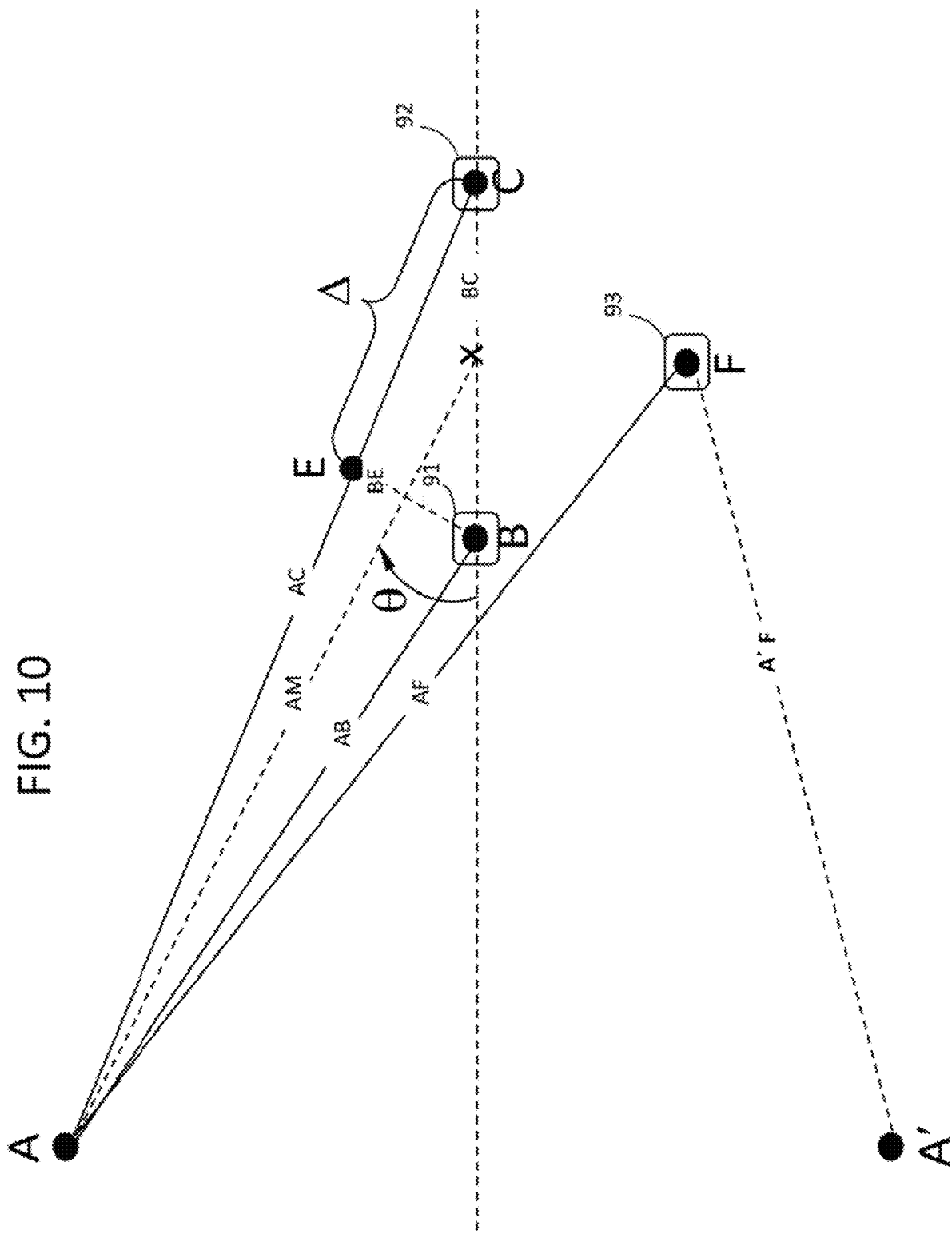
FIG. 10 shows an example of a disambiguation of a two-dimensional bearing using three antennas in a plane.

FIG. 10 shows an example of a disambiguation of a bearing using three antenna elements in a plane. Three or more antenna elements may be used to unambiguously determine the bearing of a source in two dimensions. The antenna element arrangement shown in FIG. 10 includes a third antenna element 93 at point F in addition to antennas elements 91 and 92. By inspection, path AF is longer than path A'F; a signal transmitted from an RF source at point A therefore gives different phase readings at F than the same transmitted signal from an RF source at point A'. From the phase differences between antenna elements 91 at point B, 92 at point C, and 93 at point F, the bearing of an RF source therefore can be calculated unambiguously. In the case depicted, the RF source is at point A and its bearing is θ, not −θ as if the signal source was as at point A'. The location of the RF source at point A may be estimated accurately by using three antenna elements 91 at point B, 92 at point C, and 93 at point F, as well as other signal attributes to determine range from the respective antenna elements 91-93.

In general, the bearing of an RF source (e.g., a mobile asset) may be unambiguously estimated in two dimensions from phase differences among three or more non-coplanar antenna elements. The exact positions of the three antenna elements 91, 92 and 93 are superfluous as long as the three antenna elements 91, 92 and 93 are not all in a straight line.

The above concepts may be extended to perform a three-dimensional location estimate of an RF source.

Figure 11:
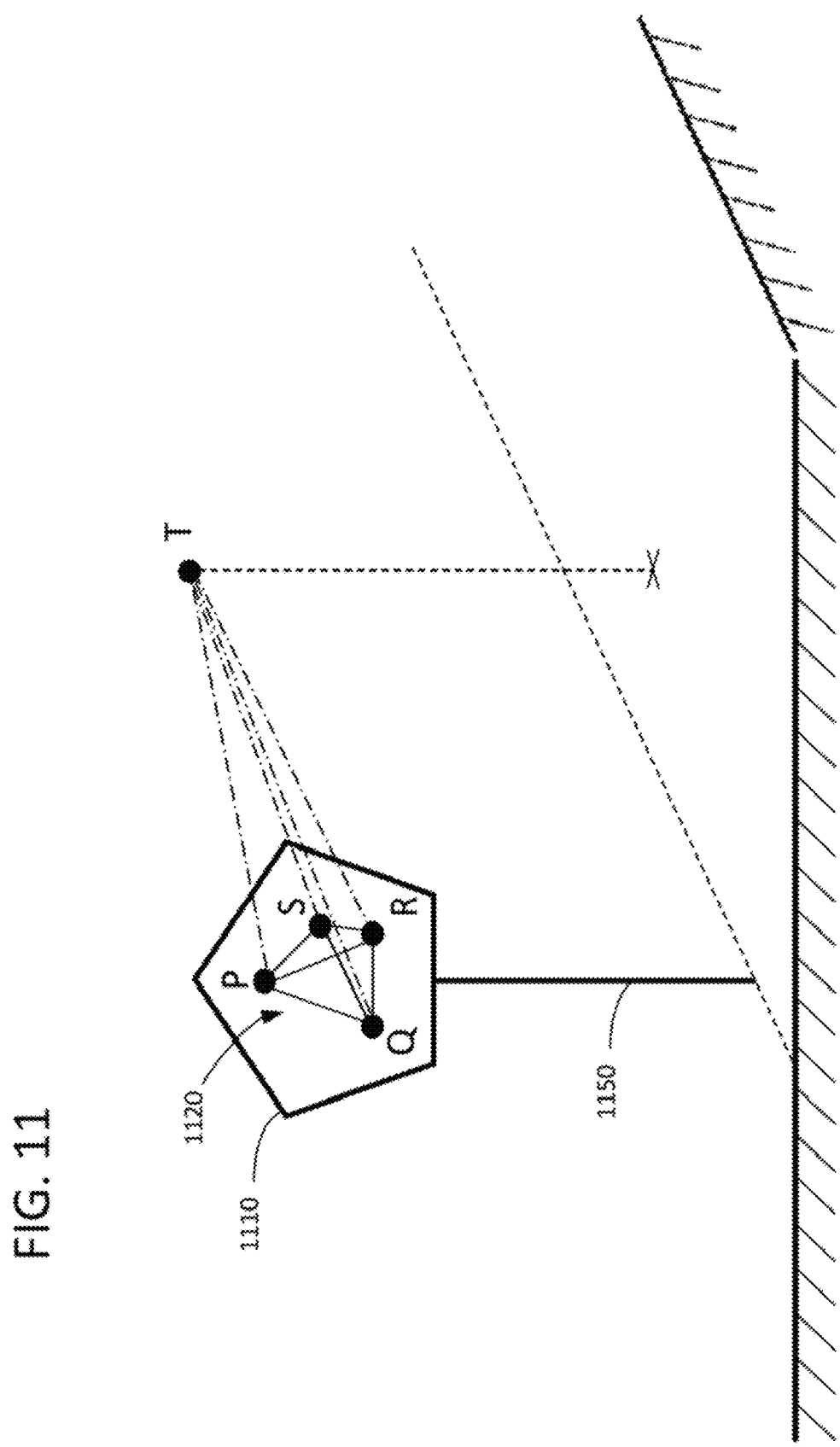
FIG. 11 illustrates an example of a relationship of a signal source in 3-dimensional space to an antenna array for use in providing a three-dimensional estimation of a location of the signal source, such as a mobile asset described in the examples of FIGS. 1, 2 and 7.

FIG. 11 illustrates an example of a relationship of a signal source in 3-dimensional space to an antenna array for use in providing a three-dimensional location estimation of a signal source, such as a mobile asset described in the examples of FIGS. 1, 2 and 7. Similar concepts as applied in the example of FIG. 10 are also applicable in a three dimensional location estimation of an RF source. The three dimensional location may be calculated from phase differences among 4 or more non-coplanar antenna elements. The exact positions of the 4 or more non-coplanar antenna elements are superfluous as long as at least one antenna of the 4 or more non-coplanar antenna elements is not in a common plane with the others.

In the example of FIG. 11, an RF node 1110 is shown with a multi-element antenna array 1120 that includes four non-coplanar antenna elements P, Q, R and S. Non-coplanar meaning that at least one of the four antenna elements P, Q, R or S is not in the same plane as the other three antenna elements. Other components of RF node 1110, such as BLE transceiver 13 or light source 11, are not shown for ease of illustration, but the RF node 1110 may be configured in a manner similar to an RF node or lighting device such as 10 in FIG. 3. The four non-coplanar antenna elements P, Q, R and S (indicated by dots) may be points that define the vertices of a tetrahedron. Phase differences measured by a tetrahedral antenna array, such as 1120, enables calculation of the bearing of a signal source, such as T in 3-dimensional space. The relationship of the signal source T in three-dimensional space to a tetrahedral multi-element antenna array 1120 and geometry of the multi-element antenna array 1120 are by way of example but may be different depending upon the use. In an example, a luminaire may likely include a lighting fixture that operates as an RF node. In another example arrangement of the antenna elements, the multi-element antenna array of the RF node may have a horizontally oriented antenna pair and a vertically oriented antenna pair that is non-coplanar with the horizontal pair.

As shown in FIG. 11, the RF node 1110 may be a pole-mounted RF node having a multi-element antenna array 1120 coupled at or near the top of the pole 1150. Since the four antenna (P, Q R and S) are, in general, at different distances from any external RF source T (e.g., a drone), the source T cannot be at the same distance from all 4 antenna elements simultaneously. A signal emitted by source T (may travel as shown by the transmission paths indicated by the dot-dash lines) therefore arrives at the four antenna elements with up to 4 phase delays that uniquely correspond to the source T's location.

When the source T is relatively distant from the multi-element antenna array 1120, range information may be difficult to extract using such an arrangement. However, when the source T is relatively close to the multi-element antenna array 1120, both bearing and range information may be extractable as explained in more detail below.

The illustrated examples provide a structure for obtaining the bearing of a mobile asset. The term "bearing" as used herein refers to a direction of an object, such as an RF signal source in the examples of FIGS. 9 and 10, from a reference direction or point. In the examples of FIGS. 9 and 10, the bearing corresponds to the direction of an RF source from the location of an RF node.

However, the bearing does not provide the distance from the respective antenna element to an RF source (i.e. range), measurements and/or calculations in addition to those described are used to provide a range estimation with respect to the RF source.

For example, if the RF source transmission power is known (e.g., because the type of transmitter used by a given mobile asset class is known from a database, or because transmit-strength information is encoded in the transmitted signal), then the range to the RF source from the RF node may be estimated by comparing received signal strength (RSS) to transmit signal strength. Note that this assumes omnidirectional transmission, for which RSS drops by the inverse square of the range regardless of direction; such transmission is typical for mobile assets. Range can also be estimated by timed-response techniques: e.g., the luminaire system transmits a command to the asset, such as a "Transmit a pulse containing your identification" command, and measures the time from command transmission until a response is received. In another example, mobile assets may be configured to regularly broadcast self-identification information, such as a mobile asset identifier (ID), in a digitally coded manner. The mobile asset ID information may be received by an RF node and be used for asset-specific communication (e.g., commands from a node that elicit pulse transmissions from a mobile asset or otherwise affect its behavior), as well as other purposes. For example, range may be determined using information such as given prior knowledge of a command response delay, a round-trip ping time, or the like. Range may also be estimated using radar methods. For example, the RF-node within a light fixture emits an RF signal and measures the time until a reflection is received from the mobile asset.

In addition, the reflective radar methods in the above examples may be combined with angle-of-arrival and other techniques to estimate asset position. Use of multiple bearing and range estimation techniques may (1) improve position estimate accuracy and (2) in some cases disambiguate location estimates in cluttered (e.g., urban or enclosed) environments where signal reflections can confound straightforward estimation.

For example, the multiple RF antenna elements (P, Q, R and S) may be disposed on or within an RF node, such as 1110 as well as capabilities for measuring properties (e.g., differential time of arrival) of RF signals detected at the multiple RF antenna elements of the antenna array. Differences in time of arrival of a signal at the multiple antenna elements may be used to estimate the direction from which the signal has come (i.e., the bearing of the signal's source). Thus, in an example, a streetlight luminaire may be equipped with a multi-element antenna array, such as 1120 according to an example can estimate the bearing and/or range of an airborne drone transmitting appropriate RF signals in its vicinity.

While the above examples noted that four non-coplanar antenna elements in a multi-element antenna array provide unambiguous bearing estimates in 3-D space, some directional information may be derived from phase data gathered by only two (2) or three (3) antenna elements, and even ambiguous estimates of direction and/or range, if collated among two (2) or more nearby nodes, can in some cases be combined to yield unambiguous or less-ambiguous location estimates. Therefore, in some examples, the information provided to the edge gateways may be information combined from multiple RF nodes that deliver information to the same or different edge gateways.

Such combining of information from multiple RF nodes may improve the mobile asset location estimate accuracy, and, in some cases may be used resolve ambiguities, such as, for example, those created by signal reflections in cluttered environments.

A specific example of combining information may include determining a Doppler shift, i.e., spectral shifting of a signal due to relative movement, may also be exploited in some example. In the example, determined Doppler shift information may be used to estimate transmitter motion and location: e.g., the Doppler effects measured by two or more non-collocated stationary antenna will in general depend upon and change with the location of the moving transmitter and differ from antenna to antenna. It should be noted that the Doppler shift of a signal from a moving source, as measured by a stationary receiver, depends on source location, source velocity vector, and receiver location. Doppler information may be combined with phase differences and other RF signal measurements and be used by a computational device as described in the above examples to produce, hone, or disambiguate estimates of transmitter location.

In addition to enabling use of the multi-element antenna array, the described examples also allow the receipt and employment by one or more nodes in the network of various kinds of data collected by mobile assets (such as movement, temperature, light detection patterns, compass headings, route histories, video, and any other data types from which locational information may be derived or the like) and the combining of the various kinds of collected data with luminaire-based or light fixture data based may be used to further improve asset location estimates.

In some examples, it is noted that received signal strength may not be a good indicator because of depleted battery. So a close asset with a depleted battery may have a weak signal strength in which case using signal strength as a proxy for distance provides erroneous indications of distance. Assets may include approximate transmit power to allow more accurate position determination.

Figure 12:
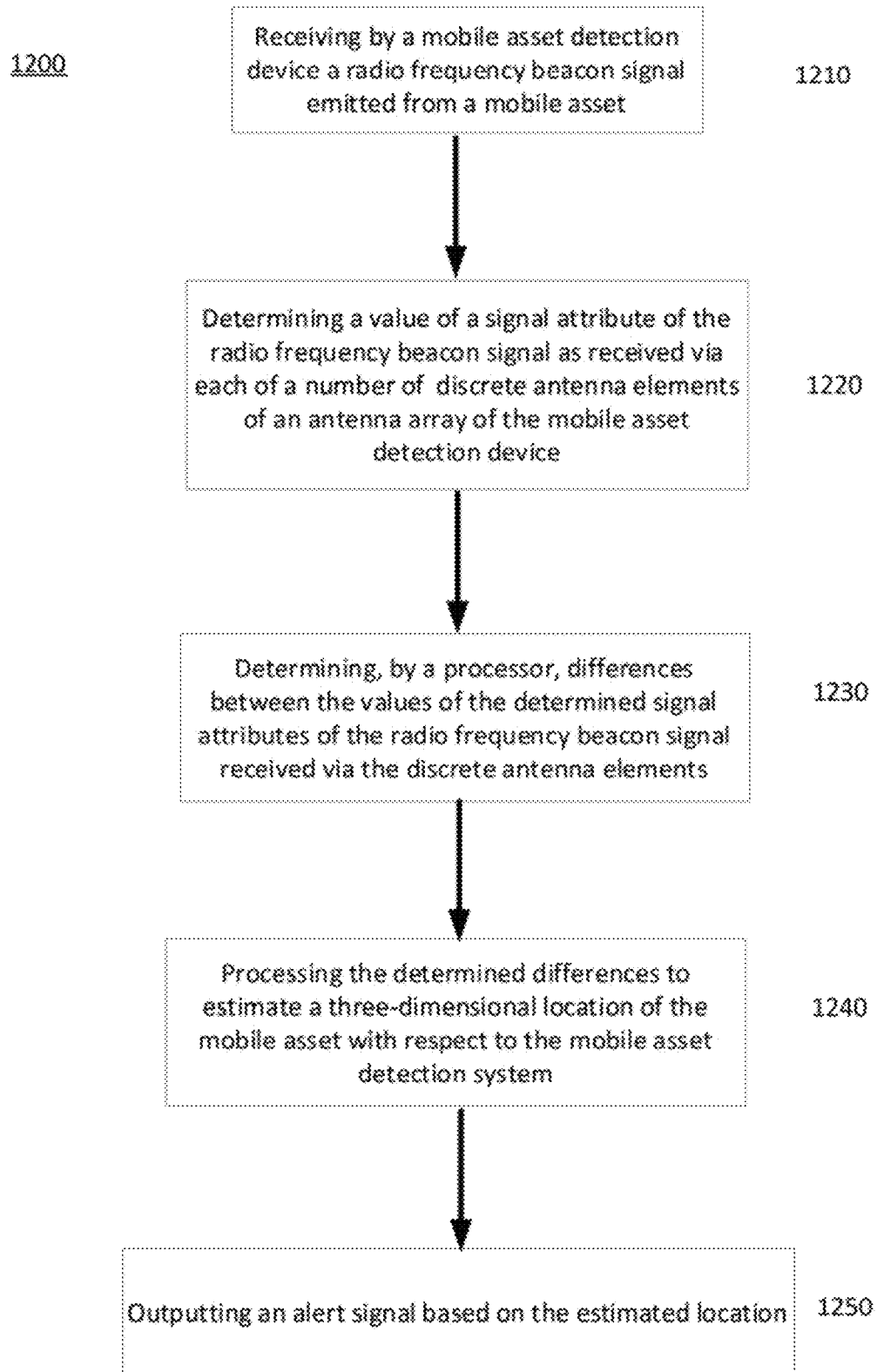
FIG. 12 is a flowchart depicting an example of a process flow for performing a three-dimensional location estimation.

It may be helpful to explain an example of a process for estimating a location of a mobile asset within a service volume with reference to a system. FIG. 12 is a flowchart depicting an example of a process flow for performing a three-dimensional location estimation as described with reference to the foregoing examples, such as the systems described with reference to FIGS. 1, 2 and 7. The process 1200 may be performed by a processor located in or at a lighting device equipped with a mobile asset detection device, such as CPU 34 of FIG. 5 or the like. As described with reference to other examples, a mobile asset detection device may be coupled to a respective light fixture of multiple light fixtures distributed in a service zone, and may also include an antenna array having multiple discrete antenna elements. At step 1210, the mobile asset detection device such as 14 of FIG. 3 may receive a radio frequency beacon signal emitted from a mobile asset, such as 125 of FIG. 1 or 621 of FIG. 7, by a mobile asset detection device.

Based on outputs of the mobile asset detection system generated in response to the received radio frequency beacon signal, a value of a signal attribute of the radio frequency beacon signal as received via each discrete antenna element of the antenna array coupled to the respective light fixture may be determined by the processor of the mobile asset detection device (1220). A signal attribute value may be determined for each discrete antenna element. So in the example of FIG. 11, a signal attribute value may be determined for each of antenna elements P, Q, R and S. For example, one or more of the determined signal attribute values may be determined based on information contained in the received beacon signal. The determined signal attribute value from each respective discrete antenna element may be stored in a memory, such as 35 of the BLE XCVR 13. The determined signal attribute value may be indicative of a quantitative value of a signal phase, an angle of arrival, a received signal strength, or a time delay of arrival.

The processor may generate information for a three dimensional location estimation based on the determined values related to the received signal attribute as received by the discrete antenna elements. For example, processor, at 1230, may determine differences between the determined values of the signal attributes of the radio frequency beacon signal received via the discrete antenna elements. Returning to the example of FIG. 11, the discrete antenna elements P. Q. R and S may all have a different signal attribute value depending upon the location of signal source T. For example, the determined differences between the determined values of the signal attribute may be the determined differences of one or more of the signal attributes, such as signal phase, angle of arrival, received signal strength, or time delay of arrival, between each of the discrete antenna elements.

The determined differences may be processed at 1240 to estimate a three-dimensional location of the mobile asset with respect to the mobile asset detection system for a time when the mobile asset transmitted the radio frequency beacon signal. For example, when estimating the three-dimensional location, the processor may access a database containing data identifying a known physical location of the mobile asset detection system. The data identifying physical location of the mobile asset detection system may be used in the processing to estimate the three-dimensional location of the mobile asset in the service volume.

Based on the estimated location, the processor may output an alert signal. A determination to output the alert may be based further on determining whether or not the mobile asset is authorized to be at or within a predetermined proximity (e.g., 150 meters or the like) the estimated location. For example, a processor may access a look up table with coordinates of exclusion zones or security perimeters that correspond to the coordinate system of the location estimate. Alternatively, the processor may be configured to translate location estimate coordinates to other coordinate systems, or vice versa.

In another example, the beacon signal may include a light fixture identifier associated with the RF node transmitting the beacon signal. The processor may be configured to associate a light fixture identifier with the values of the determined signal attribute of the radio frequency beacon signal received via the discrete antenna elements. The processor may further be configured to use the light fixture identifier to obtain data identifying a known physical location of the respective light fixture within the service volume; and use the data identifying the physical location of the mobile asset detection system in the processing to estimate the three-dimensional location of the mobile asset in the service volume.

Figure 13A:
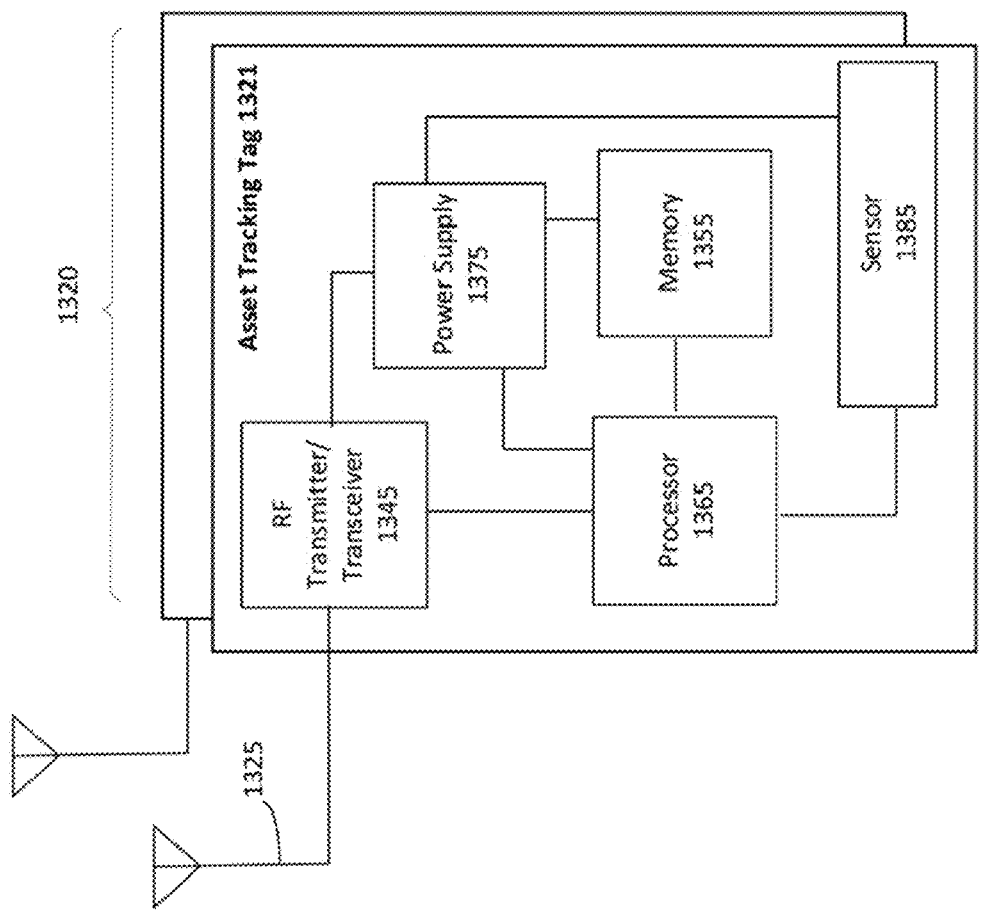
FIGS. 13A and 13B illustrate examples of an asset tracking tag or RF beacon configured to communicate with system of network RF-enabled wireless communication nodes.
Figure 13B:
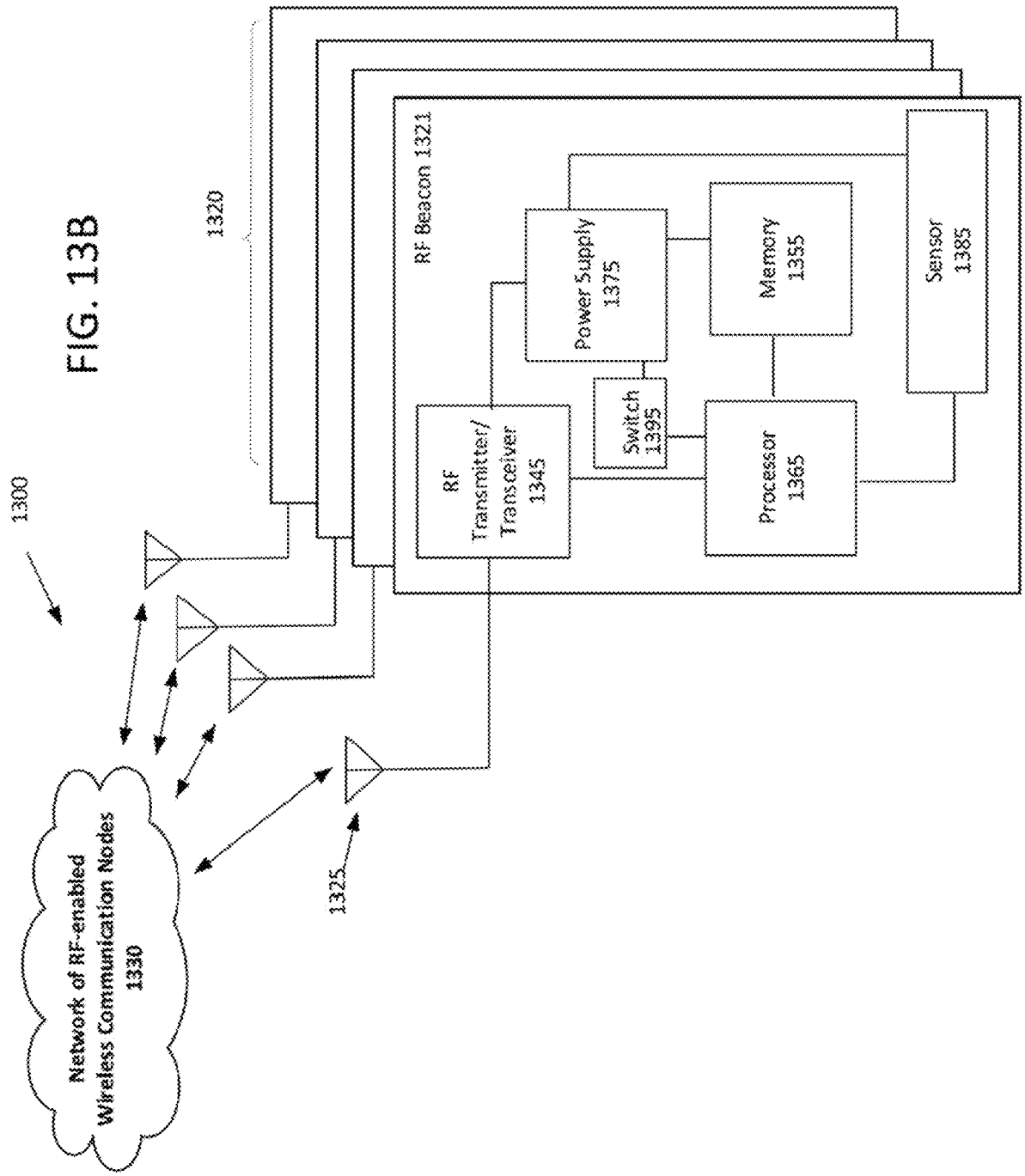

FIGS. 13A and 13B show examples of an asset tracking tag configured to communicate with a system of networked RF-enabled wireless communication nodes An asset tracking tag is configured to provide a beacon-like signal, referred to as a basic message that enables a system to locate the asset tracking tag in the space. This basic message, which is unique to each asset tracking tag, is transmitted by the tag through the wireless network and used by a computing system (e.g., a back-end server or the gateway computing device of the local network designated as a fog gateway for tracking purposes) to estimate the location of the tag and thus the associated asset within the space. A number of such tag location determinations over time can be used to track movement of the tag and thus movement of any asset to which the tag is attached or otherwise associated. Location estimates, for example, may be used to track departures and arrivals of tags/assets for the space, and other spatial and temporal metrics of interest.

As shown in FIGS. 13A and 13B, the asset tracking tag is configured to transmit a signal for reception by one or more node devices of the wireless mesh network. In some examples, the asset tracking tag does not receive signals, it only transmits a signal. The type of signaling may be configurable. For example, the asset tracking tag may only transmit a signal at set intervals based on a counter. In this example, the tag utilizes a counter in place of a clock. The counter may be settable by a remote command or the like to count up to or down from some arbitrary number, such as 10,000, 5,234, 100 or the like. Alternatively, the asset tracking tag may broadcast the basic message continuously. In another alternative, the asset tracking tag may respond to the detection of movement of the asset tracking tag and may be configured to broadcast a basic message a preset number of times or for a present number of counts. Alternatively, the asset tracking tag may detect movement, but may not transmit a basic message until no further movement is detected. Upon determining that no further movement is detected, the asset tracking tag may begin to transmit a basic message for a predetermined number of times or for a predetermined number of counts.

The basic message may include an identifier of the asset tracking tag and a basic message sequence number. The identifier of the asset tracking tag may be a unique number that uniquely identifies the asset tracking tag from all other asset tracking tags, or all asset tracking tags in a particular area. The basic message sequence number is a number assigned to each basic message that is to be transmitted from the asset tracking tag. Whenever an asset tracking tag transmits a basic message, a new basic message sequence number is transmitted.

Each basic message transmitted by each asset tracking tag may have a set "time-to-live," or TTL. One benefit of having a preset TTL is that the network of nodes does not become overwhelmed by old messages that are being continually passed around the network. The "time" may be set by the number of times the message is to be retransmitted by nodes within the network.

Other messages sent by the asset tracking tag may be, for example, asset tracking tag status messages the system status (e.g. normal, distressed, or the like), battery voltage value, environment temperature value, firmware version, the lifetime reset counter value or the like.

The RF nodes, at least some of which may be housed within a light fixture, are each configured with a radio transceiver that is radio frequency compatible with the radio frequency transmitter of the asset tracking tag. For example, the radio frequency of the radio frequency transmitter of the asset tracking tag may be the same radio frequency used by a RF transceiver of the RF nodes.

The edge gateway is radio compatible with a radio of the light fixture nodes. Each edge gateway can accommodate communications from, for example, approximately 100 light fixtures. In some examples, the edge gateway may include one or more RF transceivers a first edge gateway radio compatible with the node RF transceivers, and a second RF transceiver compatible with a fog gateway. In other examples, a single frequency band may be used for communication from the asset tags to the nodes, to the aggregators, and the fog gateway, thereby enabling the asset tag, the nodes, the edge gateway and the fog gateway to use a single RF transceiver.

The asset tracking tags 1320 may be small, smart, powered devices that exchange radio signals with nodes having networked radio capability, such as the network of RF-enabled wireless communication nodes, such as 1330. The asset tracking tag 1320 may include a number of asset tracking tags 1321 that are active in that they actively communicate to obtain and actively processes data and send information. The networked nodes of network 1330 may be lighting devices. A tag 1321 operates in a wireless network (e.g. a mesh) of the RF-enabled lighting devices (described in detail with respect to FIG. 16). As discussed above, the described system examples are configured to enable the asset tracking tags 1320 to send messages designated for delivery, for example, to one of a number of edge gateways, or to the fog gateway (as described earlier). It may be appropriate to discuss an example configuration of one of the asset tracking tags 1320 in more detail with reference to asset tag 1321.

In order to communicate, the asset tracking tags 1321 may include an antenna 1325, a radio frequency (RF) transmitter or transceiver 1345, a processor 1365, a memory 1355, a switch 1395, and at least one sensor 1385. The antenna 1325 may be coupled to the RF transmitter or transceiver 145, and configured to receive and/or emit signals within a specific radio frequency band that is compatible with the RF transmitter or receiver 1345. The RF transmitter/transceiver 1345 may be a Bluetooth transmitter/transceiver, a Zigbee transmitter/transceiver, a radio frequency identifier (RFID) transmitter/transceiver, a Wi-Fi transmitter/transceiver or other wireless communication transmitter/transceiver suitable for use in an asset tracking tag.

The processor 1365 may be coupled to the RF transmitter/transceiver 1345, the power supply 1375, the memory 1355, the switch 1395, and the sensors 1385. The processor 1365 may send signals to the RF transmitter/transceiver 1345 for transmission and/or receive signals received by the RF transmitter/transceiver 1345 obtained via the antenna 1325. For example, a fog gateway may be able to download commands via a number of edge gateways to individual nodes (not shown) within the network of RF-enabled wireless communication nodes 1330.

The memory 1355 may be a non-volatile memory, random access memory (RAM), read only memory (ROM), a Flash memory or the like. The memory 1355 may be configured to store programming instructions executable by the processor 1365. Upon execution of the programming instructions stored in the memory 1355, the processor 1365 may be configured to perform different functions. Examples of the different functions that the processor 1365 may be configured to perform upon execution of the programming code or instructions are described in more detail with reference the previous examples of FIGS. 1-7 and 12. The different functions may be internal to the processor 1365. For example, the processor 1365 may include a counter that is monitored by the processor 1365. At a predetermined count, the processor 1365 may transmit a signal, such as a beacon signal or a basic message.

The power supply 1375 may be a passive power supply, for example, a battery, a solar cell, a mechanical or electromechanical device, i.e., a motor or piezo electric device, or other form of quickly available power that is suitable for driving the various electronics associated with the asset tracking tag 1321 components, such as the RF transmitter/transceiver 1345, the processor 1365, the memory 1355 and/or the sensor 1385.

During a storage state of a traditional beacon (i.e. after manufacture, before deployment), the beacon may regularly broadcast short messages announcing their presence and identity. This consumes a small amount of power from power supply 1375, thereby reducing the operational lifetime or battery capacity for the beacon.

The sensor 1385 may be configured to detect and respond to an event that occurs in the environment in which the asset tracking tag 1321 is located. For example, the sensor 1385 may be, for example, one or more of an accelerometer, temperature sensor, humidity sensor, a photocell, a microphone, a shock sensor, motion sensor, or the like. In response to a detected stimulus (e.g., temperature, movement, noise, ambient light), the sensor 1385 may output a signal causing the processor 1365 to perform a function or process.

As described above, each of the asset tracking tags, such as 1321, may be configured to transmit signals, such as a basic message, an asset tag status message, a beacon signal and/or other signals, to one or more of RF-enabled wireless communication nodes of the network 1330. One or more of the RF-enabled wireless communication nodes of the network 1330 may be configured to receive the signals transmitted from respective asset tracking tags 1320. The asset tracking tags 1320 may also be configured to receive signals, for example, from the fog gateway via an edge gateway and the wireless RF-enabled nodes.

Figure 14A:
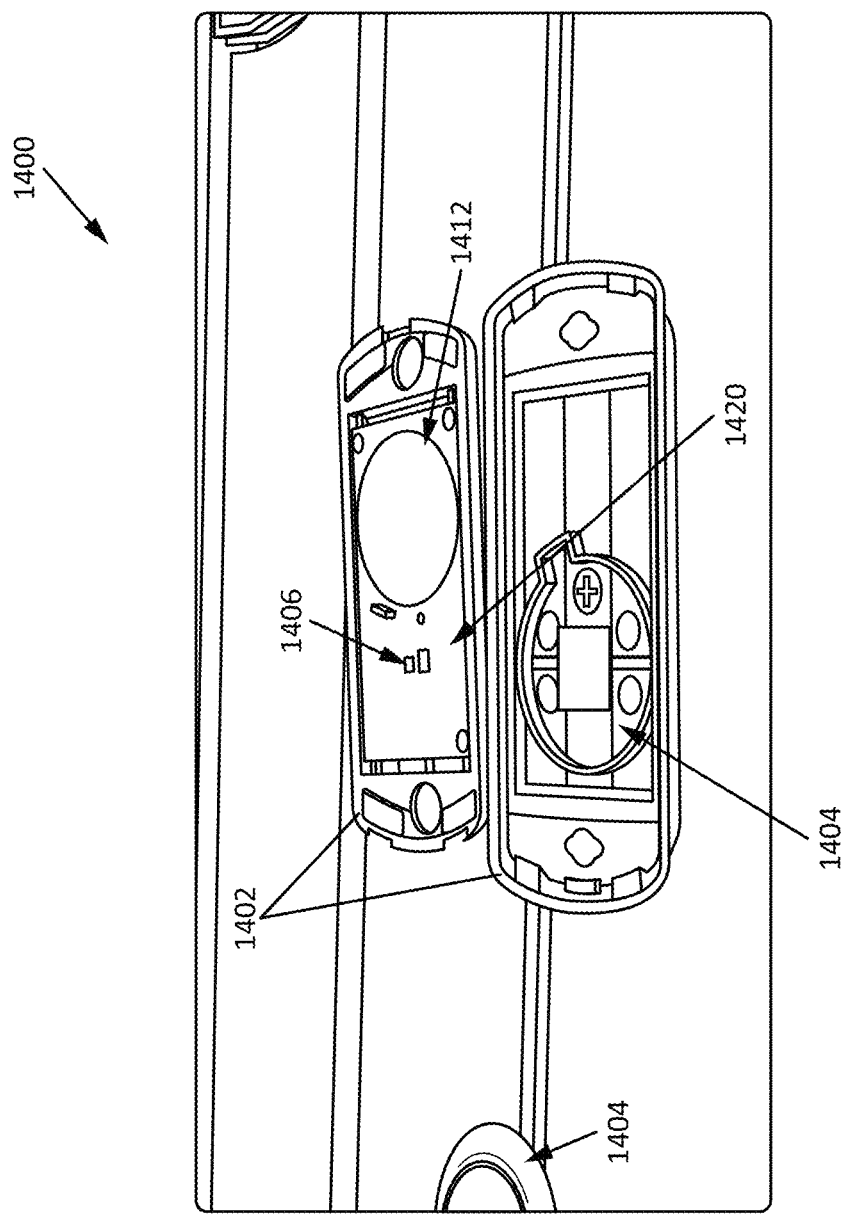
FIGS. 14A-14C depict functional and structural features of embodiments of an asset tracking tag or RF beacon.
Figure 14B:
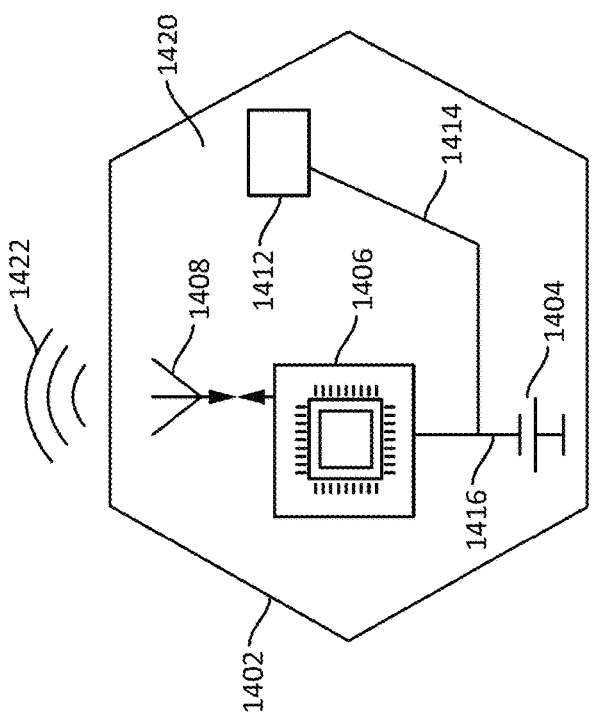
Figure 14C:
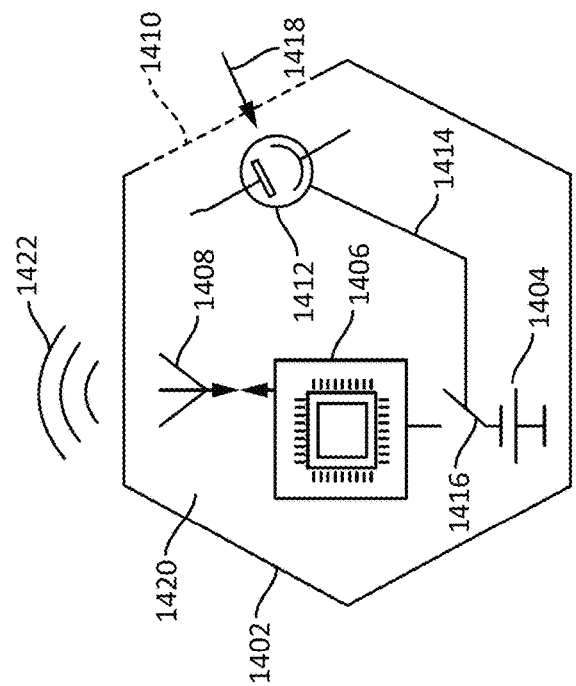

FIGS. 14A-14C depict functional and structural features of embodiments of an asset tracking tag or RF beacon.

As illustrated in FIG. 14A, the asset tracking tag includes a housing 1402 and a substrate 1420. FIG. 14A, illustrates and embodiment of the housing 1402 having first and second portions. The substrate 1420 is enclosed and supported within the housing 1402. Circuitry and elements 1406 arranged on the substrate 1420 include, for example, a microprocessor, antenna, driver, and at least one sensor 1412. At least one power source 1404 is an active power supply. Power source 1404 may be a battery, a solar cell, a mechanical or electromechanical device, i.e., a motor or piezo electric device, or other form of quickly available power that is suitable for driving the various electronics associated with the asset tracking tag.

In an embodiment of the asset tracking device of FIG. 14B, components 1406 such as a microprocessor, antenna and driver and at least one sensor 1412 are always connected to the power supply 1404 via the closed switch 1416. The at least one sensor 1412 may include a temperature sensor, a humidity sensor, a motion sensor that responds to movements of the asset tracking tag.

In another embodiment of the asset tracking tag of FIG. 14C, a transparent membrane 1410 is arranged on at least one side of the housing 1402. At least one sensor 1412 arranged on a surface of the substrate 1420 may be a photocell. The sensor 1412 is configured to detect an ambient light 1418 that enters via the membrane 1410, which may be, for example, an optically clear plastic window on the housing 1402. The detected ambient light in an area of the asset tracking tag is measured to provide an ambient light level. When the measured ambient light level is above a predetermined threshold which would indicate, for example, the tag is no longer in a shipping or storage environment, switch 1416 may be closed, via control line 1414, to connect the components 1406, 1408 to power supply 1404, which switches the asset tracking device to an "On" active mode and enables the asset tracking device to send and receive RF transmissions 1422, such as advertising broadcasts, and the beacon is fully responsive and available for all functions, including recruitment, into a wireless network, for example, commissioning or adding the asset tag to a network for the first time when introduced into a lighted area. When the measured ambient light level is below a predetermined threshold, the asset tracking device remains in a very low-power default sleep or standby mode which uses negligible power and conserves overall energy of the power supply 1404.

The switch 1416 may be realized partly or wholly by an operational mode of a computing device comprises by the beacon, for example, the microprocessor 1406 may remain in a very-low power "sleep" mode, performing few or no computations and ordering no RF broadcasts 1422, until a control voltage detected by the photocell 1412 reaches a state, (e.g., when a change from darkness to light is detected).

In various embodiments, the switch 1416 may operate asymmetrically, so that, for example, a change from darkness to light turns the asset tag or beacon on, but a change from light to darkness does not turn the beacon off, or, a change from light to darkness turns the beacon off after a certain delay, for example, 48 hours or 72 hours; or a mechanical set switch can be altered at installation to disable the light-sensitive switch permanently; or once a beacon has been commissioned into a network, its light sensitivity function can be disabled.

The photocell 1412, control line 1414, and switch 1416 may operate based upon power obtained by the photocell 1412 from ambient light 1418, or may use, for example, battery power at a very low rate, for example, $P_{switch} \ll P_s$, where $P_{switch}$ is the energy consumption of the switch, and $P_s$ is energy consumption by the beacon in a storage state, or both. The embodiment of FIG. 14C provides a benefit of reducing $P_s$ as long as the unused asset tag or beacon is in storage in its box (i.e., in the dark or low ambient light). As such, the operational lifetime $T_L$ of the beacon is increased. The maximum possible beacon lifetime, achieved for zero energy loss in storage is: $T_L(max)=E/P_O$, where $T_L$ represents the working lifetime of a beacon in its operating state, which ends when the battery is drained, E represents an amount of extractable energy in a beacon's built-in battery (effective battery capacity), and $P_O$ represents time-average rate of energy consumption by a beacon in the operating state.

And, a maximum Gain in the beacon operational lifetime for an embodiment of a beacon of FIG. 14C compared to an asset tracking tag not containing the features of FIG. 14C is: $T_{L(max)}-T_L=E/P_O-(E-P_sT_s)/P_O=P_sT_s/P_O$, where E amount of extractable energy in a beacon's built-in battery (effective battery capacity)

$P_S$ time-average rate of energy consumption by a beacon in the storage state $T_S$ time spent by a given beacon in storage state (typically boxed), i.e. between manufacture and installation $P_O$ time-average rate of energy consumption by a beacon in the operating state.

$T_L$ working lifetime of a beacon in its operating state, which ends when the battery is drained.

FIG. 15 is a flow diagram illustrating an example of a process flow for an asset tracking tag or RF beacon in which the operation life of the asset tracking tag is extended.

The process 1500 may be performed by a processor of the asset tracking tag with the tag and/or the processor being in a default or low power standby or sleep mode. As described with reference to the foregoing examples, such as the systems of FIGS. 1, 2, and 7. The processor 1365 is coupled to at least one sensor 1385 and the RF transmitter/transceiver 1345. Upon expiration of time or detection of an event, for example, detection of motion, temperature, humidity, from at least one of the sensors 1385, execute instructions perform a function. The instructions are maintained in firmware that may be stored in memory 1355.

At step 1510, upon expiration of time or detection of an event, for example, detection of motion, temperature, humidity, or a measured ambient light level above a predetermined threshold detected by at least one of the sensors 1385, execute instructions to perform a function. The instructions are maintained in firmware that may be stored in memory 1355.

At step 1520, the processor transitions the asset tracking device, in response to the expiration of the time period or the detection of the occurrence of an event, from the default standby or sleep mode to an active mode.

At steps 1530 and 1540, the switch 1395 is moved to an active source to configure the RF transmitter/transceiver to receive or transmit a data package, basic message or advertising data.

At step 1550, upon completion of the receiving or transmitting of the data packet, the processor checks for the occurrence of another event or expiration of another time period. The process remains at step 1550 until completion of any additional occurrence of another event or expiration of another time period. Upon completion, the process moves to step 1560.

At step 1560, upon the completion of the function of the event or another event, the processor transitions the radio frequency device from the active mode to the default standby or sleep mode.

The process ends at step 1570.

Figure 16:
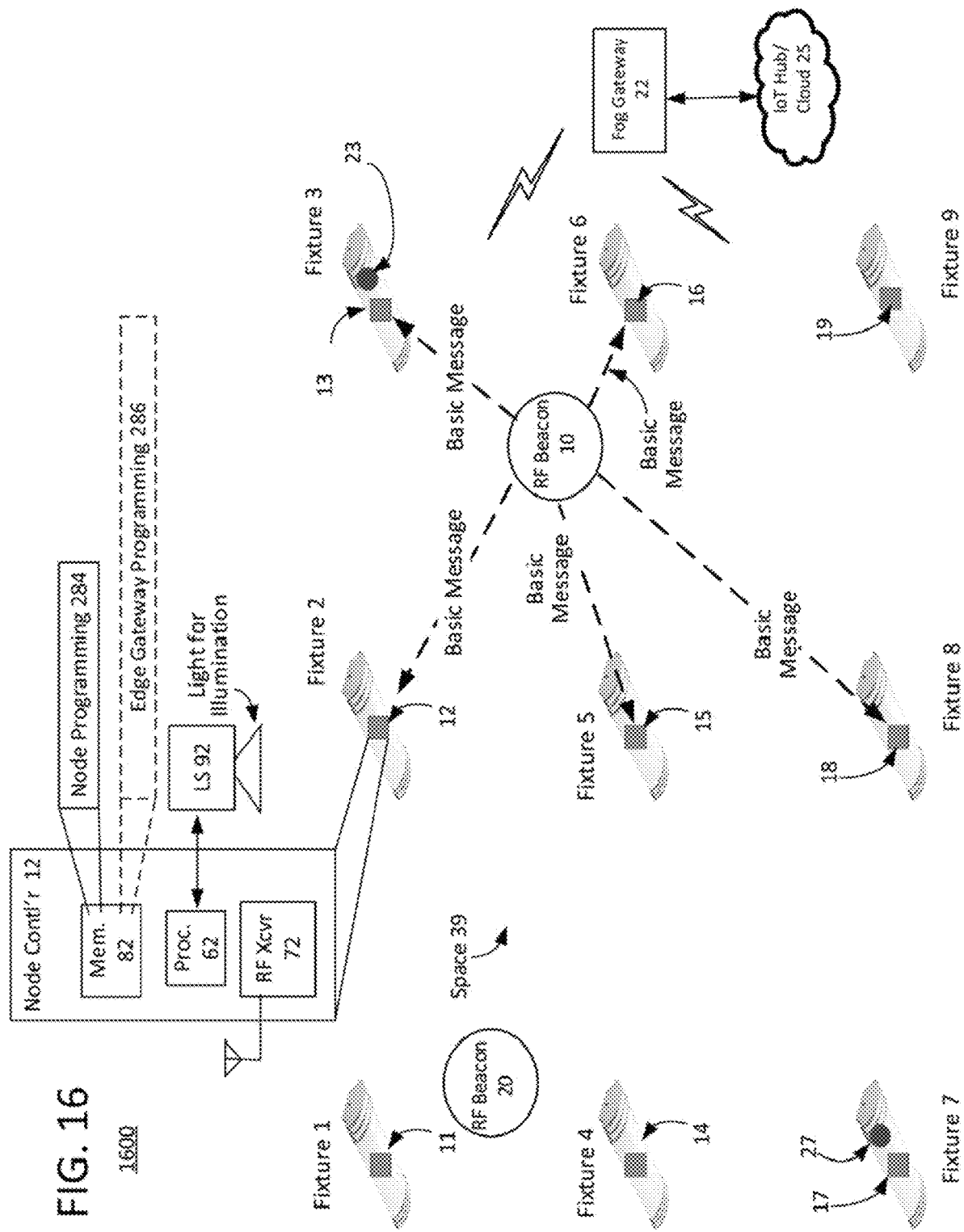
FIG. 16 depicts a system example of the functions performed by each of the system components, such as those described with reference to FIGS. 13A and 13B.

FIG. 16 depicts an example of the functions performed by each of the system components, such as those described with reference to FIGS. 13A and 13B.

Similar to system 1300, the simplistic system 1600 of FIG. 16 includes a number of RF-enabled nodes implemented in light fixtures 1-9, a number of edge gateways 23 and 27 in light fixtures 3 and 7 respectively, and a fog gateway 22.

The several light fixtures 1-9 of the system 1600 are arranged to provide general illumination within space 39, and are configured as RF-enabled wireless communication nodes in a network, such as 1330 of FIGS. 13A and 13B. In an example, two of the light fixtures 3 and 7 also are configured as edge gateways. Each of the several fixtures 1-9 has a node controller 11-19, respectively. The respective node controllers 11-19 are configured to manage nodal communications with the edge gateways 23, 27 and the controller 22 of system 1600. The respective node controllers 11-19 are also configured to communicate with the RF beacons 10, 20. In a light fixture like 3 or 7 that also functions as an edge gateway 23, 27, the node controller may also control gateway related operations, e.g. receiving messages from nodes and transmitting messages to the fog gateway. The node controller 12 of light fixture 2 is shown in detail and is representative of the other node controllers 11 and 13-19. The node controller 12 may be coupled to a light source (LS) 92 that provides illumination to the space 39.

Some light fixtures serving only as nodal devices may have only a single radio frequency (RF) type wireless transceiver for the first frequency band and/or protocol; however, at least those light fixtures serving as edge gateways have transceiver systems for two bands and/or protocols, typically two RF wireless transceivers for the first and second bands and/or protocols, typically two RF wireless transceivers for the first and second bands and/or protocols. In other examples, each RF network enabled light fixture may have both a first transceiver (e.g. a Bluetooth low energy radio) and a second transceiver (e.g. a WiFi or sub-GHz radio), although some may serve as end nodes and only use the first type transceiver. In other examples, some light fixtures in an RF network may only have the first radio frequency transceiver while others comprise systems with both types of radio transceivers for the edge gateway functionality. In still other examples, some fixtures may have one or the other radio, while some number of other fixtures may have a combination of the two RF transceiver types, (e.g. some nodes have Bluetooth only, some have WiFi or Sub-GHz only, and edge gateways have both).

The node controller 12 may include a processor 62, at least one radio frequency transceiver (RF Xcvr) or transceiver system 72, and a memory 82. The memory 82 may include programming code that when executed by the processor configures the processor 62 to perform various functions. For example, memory 82 may store node programming 284 that when executed configures the node controller 12 of fixture 2 to perform functions typically performed by nodes in the network of RF-enabled wireless communication nodes 1330 of FIGS. 13A and 13B. One purpose of a node of the plurality of nodes 1330 is to deliver data, including data obtained from received basic messages, to an edge gateway or to the asset tracking device via a first frequency band and/or protocol. Such node network functions are described in more detail below. In addition or alternatively, the memory 82 may store edge gateway programming 286. The edge gateway programming 286 when executed configures the node controller 12 to perform functions associated with an edge gateway 23 or 27. The edge gateways 23 or 27 may serve to translate messages received from node controllers 11-19 into communications suitable for exchange with the fog gateway 22. One purpose of the edge gateway is to deliver data, including aggregated message data obtained from the received node IoT messages, to and receive data from the fog gateway via a different frequency and/or protocol (e.g. WiFi or sub GHz PAN) to avoid interference/traffic from 2.4 GHz. In addition, sub GHz or WiFi radio frequency signals have a longer range than the 2.4 GHz signals (e.g. of BLE) to extend the coverage and distance between the edge gateways 23, 27 and the fog gateway 22. The functions of an edge gateway are described in more detail with reference to the example in FIG. 16 and other examples. The processor 62 may control the functions of the node within the network of RF-enabled wireless communication nodes.

Each of the light fixtures 1-9 may be assigned an identifier referred to as a node identifier in the network, and the node identifier may be stored in the respective memory of the respective node controller 11-19. For example, the node identifier of fixture 2 may be stored in the memory 82. Each light fixture processor, such as 62 of fixture 2, may, for example, be configured to control the light source (e.g. 92) and the RF transceiver (e.g., 72), and process signals and messages received from RF beacon, such as 10, within space 39, the edge gateways 23 and 27, and the fog gateway 22. For example, the node controller 12 may deliver control commands to the light source (LS) 92 of the light fixture and provide light source status information (e.g., temperature, ON duration and the like) to the fog gateway 22. Each radio frequency transceiver of respective node controllers 11-19 may be configured to receive and transmit signals within a first frequency band. For example, the radio frequency transceivers may be a Bluetooth transceiver, such as a Bluetooth Low Energy (BLE) transceiver that is configured to operate according to the Bluetooth communication protocol and transmit and receive RF signals at a frequency of approximately 2.4 GHz.

In the example of FIG. 16, the RF transceivers of the respective light fixtures 1-9 may be configured to communicate with a RF transceiver of RF beacons, such as RF beacon device 10, within the space 39.

As shown in FIG. 16, the edge gateways of the system 1600 may be co-located with one or more lighting fixtures in the space 39. For example, the edge gateways 23 and 27 are collocated with Fixture 3 and Fixture 7, respectively, of system 1600. The edge gateways 23 and 27 may be configured to operate in the first frequency band compatible with the node radio frequency transceiver. For example, the edge gateways 23 and 27 may include a BLE transceiver that performs additional processing of signals or messages received from the RF transceiver of a node controller, such as node controller 13 of fixture 3, an also process signals received from RF beacon devices 10 and 20. As an alternative to including the additional edge gateway programming 286, the edge gateway 23, 27 may be a system-on-a-chip (SOC) that provides all of the components (e.g., processor, memory, RF transceiver) of an edge gateway and receives power from a component of the light fixture such as a driver of the light source or the like. For example, using the edge gateway SOC configuration, nearly any of fixtures 1, 4-6, 8 or 9 may also be configured to provide the edge gateway functions in addition to fixtures 2, 3 and 7 that may be programmed or are already configured as edge gateways.

The fog gateway 22 may be configured for wireless data communication with the edge gateways 23 and 27. For example, the fog gateway 22 may be configured with a radio frequency transceiver (not shown) that is compatible with the radio frequency transceiver in any of the light fixtures 1-9 that utilizes the second frequency band and/or protocol.

In an alternative example, the edge gateways 23 and 27 may be equipped with a first RF transceiver system (e.g. one or more transceivers) configured to transmit and receive signals of a first frequency band and configured to receive and transmit signals in a second frequency band different from the first frequency band. For example, a first RF transceiver may be one of a Bluetooth transceiver, a Zigbee transceiver, a radio frequency identifier (RFID) transceiver, PAN transceiver or a Wi-Fi transceiver. The first RF transceiver may also be configured to operate within a first frequency band that may include 2.4 GHz or the like. At least in the edge gateways, the transceiver system may have a second transceiver configured to receive and transmit signals in the second frequency band, which may be in in the sub-GHz range, such as, for example, 900 MHz or the like. In some examples, the first RF transceiver is a Bluetooth Low Energy (BLE) transceiver and the second transceiver is a 900 MHz personal area network (PAN) protocol type transceiver, although a WiFi or other transceiver may be utilized as the second transceiver. Depending on the type of WiFi, e.g. 2G or 5G, the WiFi second frequency band may overlap with the BLE first frequency band. For example, Bluetooth signals use frequencies between 2.4000 GHz and 2.4836 GHz (the "2.4 GHz band"), while some iterations of WiFi communicate broadcast signals using frequencies in three 22-MHz-wide sub-bands spaced out within the 2.4 GHz band (2G protocol), which results in some overlap. Other iterations of the WiFi protocol call for operation in a 5 GHZ (or 5G) band ranging from 5.725 GHz to 5.875 GHz, which would be totally separate from the 2.4 GHz band used by Bluetooth.

In FIG. 16, the RF beacon device 10 is shown transmitting a basic message. The basic message may include an identifier of the RF beacon device and a basic message sequence number. The RF beacon device identifier (ID) in the basic message may be, for example, a 6 byte RF beacon ID that is unique to RF beacon device 10, at least with respect to RF beacon devices used for tracking in the space 39. In one example, however, the RF beacon device identifier (ID) may be a media access control (MAC) address of the BLE transceiver, which may be guaranteed to be globally unique by the BLE chip vendor. In a specific example, the basic message sequence number may be, for example, a 4 byte sequence number, which ensures that the sequence number will not repeat for a number of years. The number of years until a sequence number repeats is estimated to be almost 450 years.

The RF beacon/asset tracking tag 10 located in space 39 may transmit the basic message, a data packet, or advertising data into the space 39 in response to the expiration of a time period or an occurrence of an event detected by a sensor 1385 of the RF beacon device 10. The expiration of the time period or the occurrence of the event causes the RF beacon device to transition from a standby or sleep mode to a transmit mode to send the Start Dialogue message into the space 39 of the network of nodes 134. For example, an event may be a change of a counter value to a predetermined value, a timing event, receipt of an input signal from an external source, or the like. A detected stimulus may be, for example, a specific temperature, a movement, a noise above a certain level or for a predetermined duration, ambient light above a certain level, receipt of a particular signal or message from an RF enabled node, or the like.

The RF beacon device 10 transmits the data packet or basic message into the space 39 without any intended nodal recipient. In this respect, the transmitted message may be viewed as a beacon signal meant to inform any of light fixtures 1-9 in the space of the identity of the RF beacon device 10, and pause for a time period to permit the light fixture 1-9 to transition from a receive mode to a transmit mode, and to permit the RF beacon device to transition to a receive mode to receive an associated message sequence or data packet from the light fixture. Whenever the RF beacon device 10 transmits a basic message, the basic message sequence number of the transmitted basic message is incremented from the previous basic message sequence number in the basic message transmitted immediately prior to the latest transmitted basic message. For example, at counter value C=12000, IoT device 10 may send a basic message with its tag ID (e.g. XYZ) and sequence number (e.g., 100), and, at counter value C=24000, RF beacon device 10 may send a basic message with its device ID XYZ and a incremented sequence number, such as 101. For convenience in this simple example, the RF beacon device 20 is not transmitting any basic messages or other signals at this time.

Returning to FIG. 16, the data packet or basic message transmitted by the RF beacon device 10 may be received at three or more of the wireless communications nodes distributed about the space 39. In the example of FIG. 16, lighting fixtures 2, 3, 5, 6 and 8 of the light fixtures 1-9 receive the data packet or basic message transmitted by the RF beacon device 10. RF transceivers (e.g. of the first type) in the lighting fixtures 1-9 may be configured to each measure a signal attribute of any received basic message, which in this example is the message transmitted by the RF beacon device 10. In this example, each of the three or more wireless communication nodes (i.e., lighting fixtures 2, 3, 5, and 8) measure a signal attribute of the received basic message. A signal attribute of the received signal may include the received signal strength (RSS), angle of arrival (AoA), or the like. For purposes of discussion of a particular example, the received signal strength (RSS) may be measured and indicated by a value referred to as the received signal strength indicator (RSSI). Each of the RF transceivers in the RF-enabled nodes 11-19 in such an example may be configured to output an RSSI corresponding to any received basic message signal to the light fixture processor (not shown in this example). The light fixture processor may control the light source and the light fixture RF transceiver, and may be configured to process the basic message signals received from the asset tracking tag 10 as well as the RSSI values output by the RF transceiver in the particular node.

Figure 17:
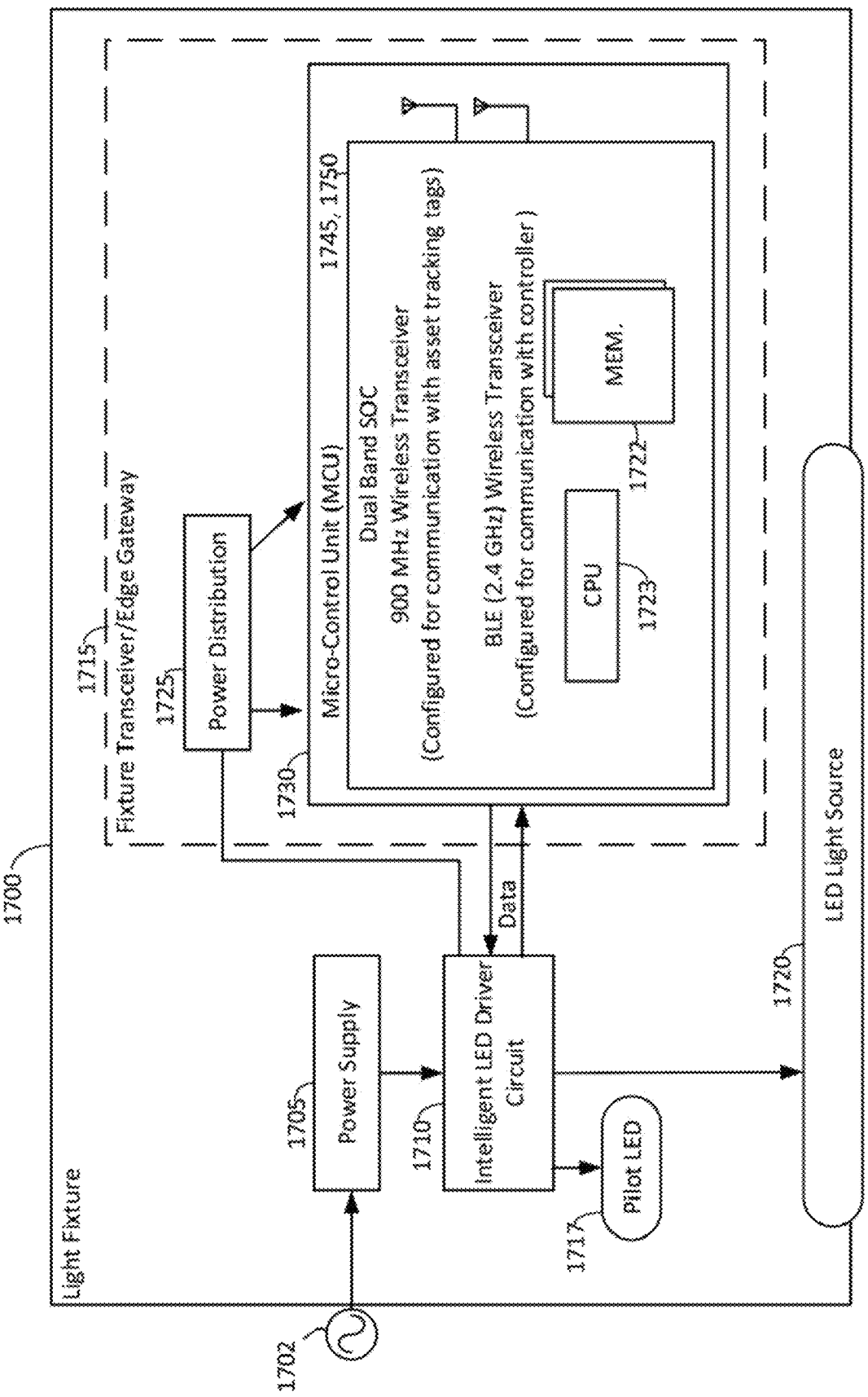
FIG. 17 depicts logical, functional, and structural features of an example of a radio frequency communication enabled light fixture suitable for use as a node and edge gateway in a network of RF-enabled wireless communication nodes.

FIG. 17 is a block diagram of a light fixture 1700 that communicates as a node within the network of RF-enabled wireless communication nodes of FIG. 13B. Light fixture 1700 is an integrated light fixture that generally includes a power supply 1705 driven by a power source 1702. Power supply 1705 receives power from the power source 1700, such as an AC mains, battery, solar panel, or any other AC or DC source. Power supply 1705 may include a magnetic transformer, electronic transformer, switching converter, rectifier, or nay other similar type of circuit to convert an input power signal into a power signal suitable for light fixture 1700.

Light fixture 1700 furthers include an intelligent LED driver circuit 1710, fixture control/edge gateway 1715, and a light emitting diode (LED) light source 1720. Intelligent LED driver circuit 1710 is coupled to LED light source 1720 and drives that LED light source 1720 by regulating the power to LED light source 1720 by providing a constant quantity or power to LED light source 1720 as its electrical properties change with temperature, for example. The intelligent LED driver circuit 1710 includes a driver circuit that provides power to LED light source 1720 and a pilot LED 1717. Intelligent LED driver circuit 1710 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 1710 is manufactured, for example, by EldoLED.

LED driver circuit 1710 can further include an AC or DC current source or voltage source, a regulator, an amplifier (such as a linear amplifier or switching amplifier), a buck, boost, or buck/boost converter, or any other similar type of circuit or component. LED driver circuit 1710 outputs a variable voltage or current to the LED light source 1720 that may include a DC offset, such that its average value is nonzero, and/or an AC voltage. The pilot LED 1717 indicates the state of the light fixture 1700, for example, during the commissioning and maintenance process. The light fixture 1700 is line powered and remains operational as long as power is available.

For purposes of communication and control, light fixture 1700 may be treated as single addressable device by the fog gateway that can be configured to operate as a member of one or more lighting control groups or zones. For example, light fixture 1700 that functions as an edge gateway may be strategically located to more likely receive node asset messages from a likely group of light fixtures not configured with an edge gateway.

Fixture control/edge gateway 1715 includes power distribution circuitry 1725, a micro-control unit (MCU) 1730, drive/sense circuitry 17335, and detector(s) 1765. As shown, MCU 1730 is coupled to LED driver circuit 1710 and controls the light source operation of the LED light source 1720. MCU 1730 includes a memory 1722 (volatile and non-volatile) and a central processing unit (CPU) 1723. The memory 1722 includes a lighting application 1727 (which can be firmware) for both lighting control operations and commissioning, maintenance, and diagnostic operations. The power distribution circuitry 1725 distributes power and ground voltages to the MCU 1730, drive/sense circuitry 1735, wireless transceivers 1745 and 1750, and detector(s) 1765 to provide reliable operation of the various circuitry on the fixture control/edge gateway 1715 chip.

In the example of FIG. 17, light fixture 1700 also includes a dual-band wireless radio communication interface system configured for two way wireless communication. It should be understood that "dual-band" means communications over two separate RF bands. For example, a system control radio frequency transceiver may be configured to transmit and receive signals in a second frequency band different from the first frequency band. In some examples, each of the edge gateways may be configured to transmit the aggregated message via the system control radio frequency transceiver for receipt by the fog gateway, such as 22 of FIG. 16. The communication over the two separate RF bands can occur simultaneously (concurrently); however, it should be understood that the communication over the two separate RF bands may not actually occur simultaneously. In our example, light fixture 1700 has a radio set that includes first RF transceiver 345 for sub-GHz communications (also referred to as the system control RF transceiver) and a second RF transceiver 350 for Bluetooth RF communications. The first transceiver 345, such as a 900 MHz wireless transceiver, may issue control operations for lighting control via a nodal network (e.g., the network of RF-enabled wireless communication nodes, such as 1330 of FIG. 13B). This first transceiver 1745 is for wireless communication over the first RF range with other light fixtures for lighting control purposes and for asset tracking tag location estimation both via the nodal network. Two transport methods may be sent via the network layer function of the first transceiver 1745: unicast and multicast. The first transceiver 1745 engages in multicast group communication of a one-to-many (e.g. a flooding network protocol) or a many-to-many distribution where group communication is addressed to a group simultaneously (e.g. multiple fixtures commonly assigned to function together, such as fixture 1, 5 and 9, or a group of asset tracking tags, such as 10 and 20, of FIG. 16).

A second transceiver 1650, such as a 2.4 GHz BLE (Bluetooth) wireless transceiver receives commands from the fog gateway (not shown in this example) that related to commissioning, maintenance, and diagnostics of the lighting fixtures. This second transceiver 1750 is for point-to-point communication between the edge gateway and the fog gateway, over a second of the two different RF frequency bands (i.e. wireless communication bands), of information (such as aggregated messages in the asset tracking location estimation process explained above with reference to FIGS. 1-12). In addition, the second transceiver 1750 may receive from the fog gateway control and systems operations information, concurrently with at least some communications over the first wireless communication band of the first transceiver 1745.

As shown, the MCU 1730 includes programming in the memory 1722 which configures the CPU (processor) 1723 to control operations of the respective light fixture 1700, including the communications over the two different wireless communication bands via the dual-band wireless radio communication interface system 1745, 1750. The programming in the memory 1722 includes firmware/software that enables operation of an asset tracking tag or beacon communication and location estimation processes as well as commissioning and maintenance of the light fixture via a lighting system fog gateway, such as 22 of FIG. 16. The programming in the memory 1722 may, for example, enable the processor 1723 to carry out lighting control operations over the system 1700 via the network of RF-enabled wireless communication nodes of FIG. 13B, or the system 1600 of FIG. 16.

The process described with respect to FIG. 16 remains substantially the same when the edge gateway is configured with the first RF transceiver and the second RF transceiver. For example, the processor 1723 of FIG. 17 may convert the node asset messages generated in response to receipt of the basic messages from the asset tracking tag according to protocol into a data packet suitable for transmission via the second RF transceiver as an aggregated message, or other type of message, such as a status message, control signal acknowledgement or the like. Conversely, the processor 1723 of FIG. 17 may be configured to receive signals via the second RF transceiver and convert the received signals according to a protocol into data packets suitable for transmission via the first RF transceiver to, for example, either the asset tracking tags or to other fixtures.

Figure 19:
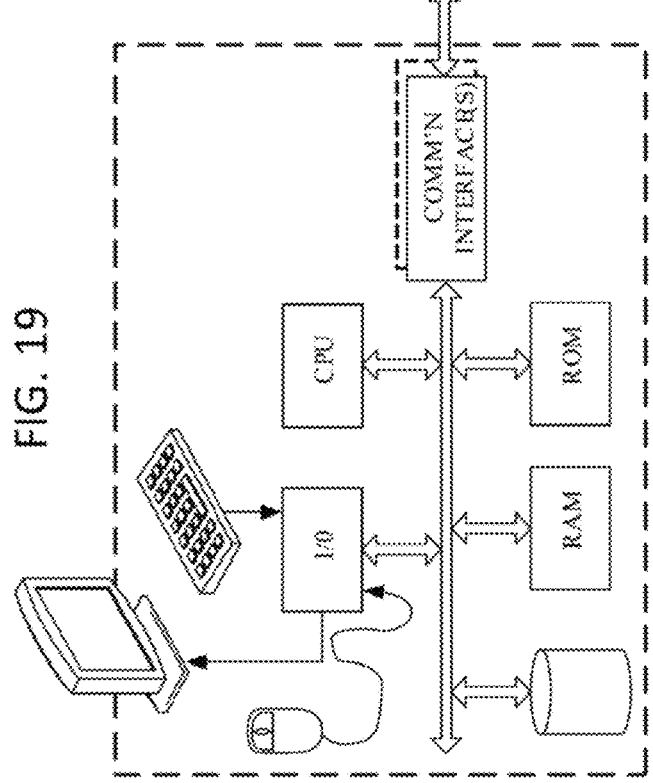
FIG. 19 is a simplified functional block diagram of a personal computer or other work station or terminal device usable for receiving data or information from the RF beacon in the examples of FIGS. 13A and 13B.
Figure 18:
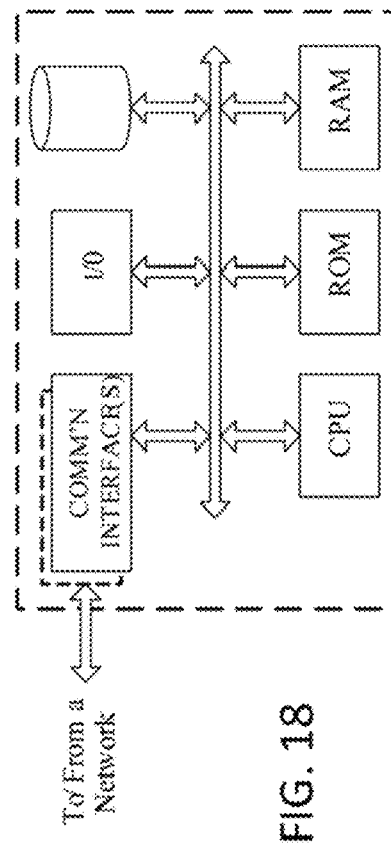
FIG. 18 is a simplified functional block diagram of a computer that may be configured as a host or server, for example, to function as a server for the transmission of messages to/from the asset tag or RF beacon.

FIGS. 18 and 19 provide functional block diagram illustrations of general purpose computer hardware platforms. FIG. 18 illustrates a network or host computer platform, as may typically be used to implement a server. FIG. 19 depicts a computer with user interface elements, as may be used to implement a personal computer or other type of work station or terminal device, although the computer of FIG. 19 may also act as a server if appropriately programmed. It is believed that those skilled in the art are familiar with the structure, programming and general operation of such computer equipment and as a result the drawings should be self-explanatory.

Hardware of a server computer, for example (FIG. 18), includes a data communication interface for packet data communication. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

Figure 20:
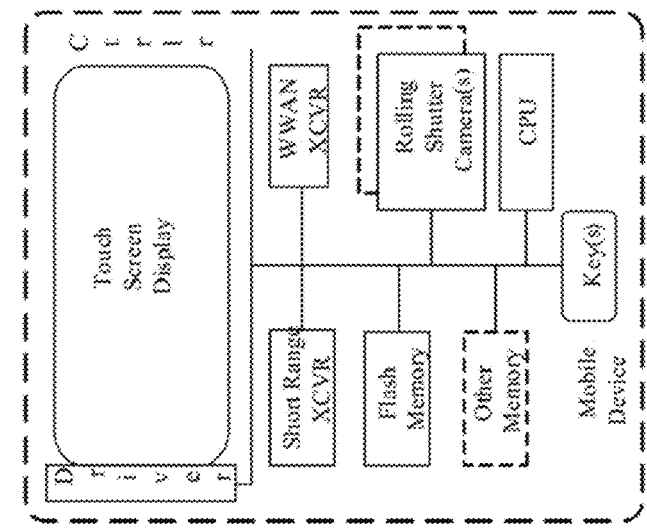
FIG. 20 is a simplified functional block diagram of a mobile device usable for executing applications and/or receiving information related to the RF beacon device in the examples of FIGS. 13A and 13B.

FIG. 19 depicts a computer with user interface elements, as may be used to implement a portable device or other type of work station or terminal device, although the computer of FIG. 19 may also act as a server if appropriately programmed. Hardware of a computer type user terminal device, such as a PC or tablet computer, may include a data communication interface, CPU, main memory and one or more mass storage devices for storing user data and the various executable programs (see FIG. 19). A mobile device (FIG. 20) type user terminal may include similar elements, but will typically use smaller components that also require less power, to facilitate implementation in a portable form factor. It is believed that those skilled in the art are familiar with the structure, programming and general operation of such computer equipment and as a result the drawings should be self-explanatory. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphone type mobile devices include similar but smaller input and output elements. Tablets and other types of smartphone type mobile devices utilize touch sensitive display screens, instead of separate keyboard and cursor control elements. In the example (FIG. 20), the mobile device may be configured to receive the asset tag location estimate for presentation of the estimated location to a user via a touch screen display of the mobile device. The hardware elements, operating systems and programming languages of such user terminal devices also are conventional in nature, and it is presumed that those skilled in the art are adequately familiar therewith The location estimation processes described herein may be implemented by execution of programming code by a processor such as one or more of those described above.

Program or data aspects of the technology discussed above therefore may be thought of as "products" or "articles of manufacture" typically in the form of executable programming code (firmware or software) or data that is carried on or embodied in a type of machine readable medium.

"Storage" type media include any or all of the tangible memory of lighting fixtures 10 or drivers 16 or transceivers 13, 15 thereof, as well as various computer platforms, such as that of the fog gateway 751, a host or server computer 603 or user terminal 605 on an external network 601, or any of the various processors or the like, such as various volatile or non-volatile semiconductor memories, tape drives, disk drives and the like, which non-transitory devices may provide storage at any time for executable software or firmware programming and/or any relevant data or information. All or portions of the programming and/or configuration data may at times be communicated through the Internet or various other telecommunication networks. Such communications, for example, may enable loading of the data or programming from one computer or processor into another, for example, from the fog gateway 751, a management server or host computer of a lighting system or BCAS management system type service provider into any of the light fixtures 10. Thus, another type of media that may bear the programming or data elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

The programming or data for estimating the three-dimensional location of a mobile asset may be embodied in at least one machine readable medium, one or more of which may be non-transitory. For example, if downloaded to a light fixture 10, the programming or data could be stored in a hardware device that serves as the memory/storage of the driver or transceiver(s) of the light fixture. The memory/storage is an example of a non-transitory type of media. By way of another example, at times, executable operational programming, including programming and/or data for the three-dimensional location estimation, may reside in the memory/storage of the fog gateway, a server or user terminal device and be streamed over the network media to one or more light fixtures. In these later examples, the signal(s) on the network would be transitory in nature. However, the buffer memory and any memory or registers internal to the processor memory, or any hardware storage device used by the fog gateway, server or other computer to maintain the programming and any data or to prepare selected programming or data for transmission over the network would be additional examples of non-transitory media.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, unless expressly stated otherwise, a parameter value or the like may vary by as much as ±10% from the stated amount.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Thus the following claims are hereby incorporated into the Detailed Description, with each claim standing on its own as a separately claimed subject matter.

What is claimed is:

1. A wireless radio frequency device, each wireless radio frequency device comprising:
a substrate wholly enclosed and supported within a housing of the wireless radio frequency device, the housing having a first portion and a second portion such that the substrate is enclosed therebetween for an operation of the wireless radio frequency device;
at least one sensor arranged on a surface of the substrate and configured to detect an occurrence of an event;
a radio frequency transceiver arranged on the substrate and configured to transmit and receive radio frequency signals in an area;
at least one power supply coupled with the substrate;
a transparent membrane arranged on a side of at least one of the first portion or the second portion of the housing of the wireless radio frequency device, wherein ambient light in an area of the wireless radio frequency device is detected via the transparent membrane; and
a processing device coupled to the at least one sensor and the radio frequency transceiver, wherein the processing device is configured, upon execution of instructions maintained in firmware, to:
in response to expiration of a time period or the detection of the occurrence of an event, transition the wireless radio frequency device from a sleep mode to an active mode;
configure the radio frequency transceiver to receive or transmit a data packet;
upon completion of the receiving or transmitting of the data packet, obtain a status of an occurrence of another event from the at least one sensor; and
upon completion of a function of the another event, transition the wireless radio frequency device from the active mode to the sleep mode.

2. The device of claim 1, wherein the at least one sensor is a photocell configured on a surface of the substrate to detect an ambient light level in the area of the wireless radio frequency device.

3. The device of claim 2, wherein the at least one sensor further comprises a temperature sensor, a humidity sensor, or a motion sensor that responds to movements of the wireless radio frequency device.

4. The device of claim 1, wherein the processing device is further configured to connect or disconnect a control link between the power supply and the radio frequency transceiver based upon a result of the detection of the occurrence of the event.

5. The device of claim 1, wherein one of the at least one power supply is passive power source.

6. The device of claim 5, wherein the passive power source is at least one of a solar cell, a mechanical device, or an electromechanical device.

7. The device of claim 1, wherein the data packet is a radio frequency (RF) signal or marketing information.

8. The device of claim 1, wherein the detected event is a measurement of an ambient light level within a predetermined threshold value.

9. The device of claim 1, wherein the wireless radio frequency device is an asset tracking tag.

10. A system, comprising:
a plurality of radio frequency-enabled nodes networked to communicate in an area, wherein each respective node is configured to transmit and receive a radio frequency signal; and
a wireless radio frequency device configured to communicate with one or more of the radio frequency-enabled nodes, the wireless radio frequency device comprising:
a substrate wholly enclosed and supported within a housing of the wireless radio frequency device, the housing having a first portion and a second portion such that the substrate is enclosed therebetween for an operation of the wireless radio frequency device;
at least one sensor arranged on a surface of the substrate and configured to detect an occurrence of an event;
a radio frequency transceiver arranged on the substrate and configured to transmit and receive radio frequency signals in an area;
at least one power supply coupled with the substrate;
a transparent membrane arranged on a side of at least one of the first portion or the second portion of the housing of the wireless radio frequency device, wherein ambient light in an area of the wireless radio frequency device is detected via the transparent membrane; and
a processing device coupled to the at least one sensor and the radio frequency transceiver, wherein the processing device is configured, upon execution of instructions maintained in firmware, to:
in response to expiration of a time period or the detection of occurrence of the event, transition the wireless radio frequency device from a sleep mode to an active mode;
configure the radio frequency transceiver to receive or transmit a data packet;
upon completion of the receiving or transmitting of the data packet, obtain a status of an occurrence of another event from the at least one sensor; and
a upon completion of a function of the another event, transition the wireless radio frequency device from the active mode to the sleep mode.

11. The system of claim 10, wherein the at least one sensor is a photocell configured on a surface of the substrate to detect an ambient light level in the area of the wireless radio frequency device.

12. The system of claim 11, wherein the at least one sensor further comprises a temperature sensor, a humidity sensor, or a motion sensor that responds to movements of the wireless radio frequency device.

13. The system of claim 10, wherein the processing device is further configured to connect or disconnect a control link between the power supply and the radio frequency transceiver based upon a result of the detection of the occurrence of the event.

14. The system of claim 10, wherein one of the at least one power supply is a passive power source.

15. The system of claim 14, wherein the passive power source is at least one of a solar cell, a mechanical device, or an electromechanical device.

16. The system of claim 10, wherein the data packet is radio frequency (RF) signal or marketing information.

17. The system of claim 10, wherein the detected event is a measurement of an ambient light level within a predetermined threshold value.

18. The system of claim 10, wherein the wireless radio frequency device is an asset tracking tag.

* * * * *